United States Patent
De Smet et al.

(10) Patent No.: US 10,565,110 B2
(45) Date of Patent: Feb. 18, 2020

(54) REDUCING MEMORY USAGE FOR LONG STANDING COMPUTATIONS

(71) Applicant: Microsoft Technology Licensing, LLC, Redmond, WA (US)

(72) Inventors: Bart J. F. De Smet, Bellevue, WA (US); Eric Anthony Rozell, Somerville, MA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 484 days.

(21) Appl. No.: 15/226,674

(22) Filed: Aug. 2, 2016

(65) Prior Publication Data
US 2018/0039575 A1 Feb. 8, 2018

(51) Int. Cl.
*G06F 12/00* (2006.01)
*G06F 12/0811* (2016.01)
*G06F 12/0875* (2016.01)

(52) U.S. Cl.
CPC ...... *G06F 12/0811* (2013.01); *G06F 12/0875* (2013.01); *G06F 2212/283* (2013.01); *G06F 2212/452* (2013.01)

(58) Field of Classification Search
CPC ............ G06F 12/0811; G06F 12/0875; G06F 2212/283; G06F 2212/452
See application file for complete search history.

(56) References Cited

U.S. PATENT DOCUMENTS

| | | | |
|---|---|---|---|
| 5,675,801 A | 10/1997 | Lindsey | |
| 5,835,771 A | 11/1998 | Veldhuizen | |
| 5,905,894 A | 5/1999 | De Bonet | |
| 6,178,461 B1 * | 1/2001 | Chan | H04L 67/2823 709/247 |
| 6,877,025 B2 | 4/2005 | Copeland et al. | |
| 6,920,364 B2 | 7/2005 | Nonaka et al. | |

(Continued)

FOREIGN PATENT DOCUMENTS

EP 0709773 A1 5/1996

OTHER PUBLICATIONS

Hazzard, et al., "Metaprogramming in .NET", In Publication of Manning, Dec. 2012, 42 pages.
(Continued)

*Primary Examiner* — Kalpit Parikh
(74) *Attorney, Agent, or Firm* — Jeffrey L. Ranck; Ranck IP Law

(57) ABSTRACT

Representative embodiments disclosed compress expressions so they utilize less physical storage. An expression is placed in a standard representation, such as an expression tree. The system utilizes one or more rules to identify portions of the expression that are likely to be common to other expressions. The common portions are extracted from the expression tree as a template and the remaining portions are hoisted from the expression as unique portions. If the template does not already reside in a cache, the template is stored in the cache. A cache reference is obtained for the template and combined with the unique portions to create a bundle that reduces storage requirements for the expression. The original expression is recovered by retrieving the template from the cache using the cache reference and placing the hoisted unique portions into their original locations in the template.

20 Claims, 12 Drawing Sheets

(56) References Cited

U.S. PATENT DOCUMENTS

| | | | |
|---|---|---|---|
| 7,793,220 B1 * | 9/2010 | Liang | G06F 17/3089 |
| | | | 715/235 |
| 8,091,071 B2 | 1/2012 | Tsantilis | |
| 8,249,732 B2 | 8/2012 | Stephens et al. | |
| 8,312,440 B2 | 11/2012 | Iwama et al. | |
| 8,365,142 B2 | 1/2013 | Kajiya | |
| 8,572,560 B2 | 10/2013 | Drissi et al. | |
| 8,893,294 B1 * | 11/2014 | Steele, III | G06F 16/9574 |
| | | | 726/26 |
| 2005/0097078 A1 | 5/2005 | Lohman et al. | |
| 2008/0256509 A1 | 10/2008 | Mazzeranghi | |
| 2017/0188213 A1 * | 6/2017 | Nirantar | G06F 9/547 |

OTHER PUBLICATIONS

Beckmann, et al., "Runtime Code Generation in C++ as a Foundation for Domain-Specific Optimisation", In International Seminar on Domain-Specific Program Generation, Mar. 23, 2003, 16 pages.
Vogel, Lars, "Groovy with Eclipse—Tutorial", Published on: Jan. 29, 2015, Available at: http://www.vogella.com/tutorials/Groovy/article.html.
"C++ meta-programming doxygen documentation", Retrieved on: May 30, 2016, Available at: http://stackoverflow.com/questions/3435225/c-meta-programming-doxygen-documentation.
Kabra, et al., "Efficient Mid-Query Re-Optimization of Sub-Optimal Query Execution Plans", In Proceedings of the ACM SIGMOD International Conference on Management of Data, Jun. 1, 1998, pp. 106-117.
"International Search Report and Written Opinion Issued in PCT Application No. PCT/US2017/044056", dated Sep. 29, 2017, 10 Pages.

* cited by examiner

REDUCING MEMORY USAGE FOR LONG STANDING COMPUTATIONS

FIELD

This application relates generally to reduced memory usage in computer systems. More specifically, embodiments disclosed herein reduced memory in systems that have long-running computations.

BACKGROUND

Numerous systems exist today that allow long-running computations. In this context long-running means that the computations persist for an extended time, not necessarily that the computations themselves take a lot of time. For example, users can subscribe to systems that send alerts when particular events happen or can request periodic updates to information. For example, a user may want such a system to notify the user of the weather in a particular city each day. As another example, a user may want to be notified whenever the stock market reaches a particular threshold. To identify the weather or the stock market value may not take a long time, but the user's request has no end date (at least in these examples) and the system may perform the tasks over an extended period of time.

As the number of such long-running computations increase, management of the long-running computations can become a challenge.

DETAILED DESCRIPTION

The description that follows includes illustrative systems, methods, user interfaces, techniques, instruction sequences, and computing machine program products that exemplify illustrative embodiments. In the following description, for purposes of explanation, numerous specific details are set forth in order to provide an understanding of various embodiments of the inventive subject matter. It will be evident, however, to those skilled in the art that embodiments of the inventive subject matter may be practiced without these specific details. In general, well-known instruction instances, protocols, structures, and techniques have not been shown in detail.

Overview

Embodiments disclosed herein reduce the memory usage of expressions that persist in a system for a period of time. As used herein, expressions cover metaprogramming expressions, where code is treated as data, as well as filters, queries, rules, policies, or other similar structures that are designed to select data or perform an action, often when a condition or set of conditions are met. As an example, an expression may be part of a digital assistant or other system that proactively informs the user of particular information when a condition or set of conditions exist. Such might be the case where a user wishes to be informed when it is raining outside or when a user requests that her schedule for the day be presented each morning. Expressions also exist in cloud service architectures where the cloud service needs to keep many pieces of code in memory at a given time.

As the number of users increases, a system can have tens of millions or hundreds of millions of expressions in standing computations. This presents a problem of resource management and a tradeoff between keeping the expressions in memory where they can be easily accessed and yet efficiently utilize memory and other storage of the system. The system will be presented in this disclosure as a cloud service or at least utilizing a cloud service architecture. However, a single system or cluster of systems, and so forth also provide appropriate context for the disclosure as discussed below. As will be explained, the disclosure is particularly applicable where a system has to store many expressions that derive from a relatively limited number of templates.

Embodiments described herein take expressions and convert them to a common format, such as an expression tree. The portions of the expression tree that are common across expressions or likely to be common across expressions are then separated from the portions that are unique to the expression. The common portion is cached in a cache and a reference to the common portion is bundled with the unique portions of the expression in order to reduce the storage requirements of the expressions. Rehydration (i.e., recovery of the original expression) occurs by reversing the process.

Description

Figure 1:
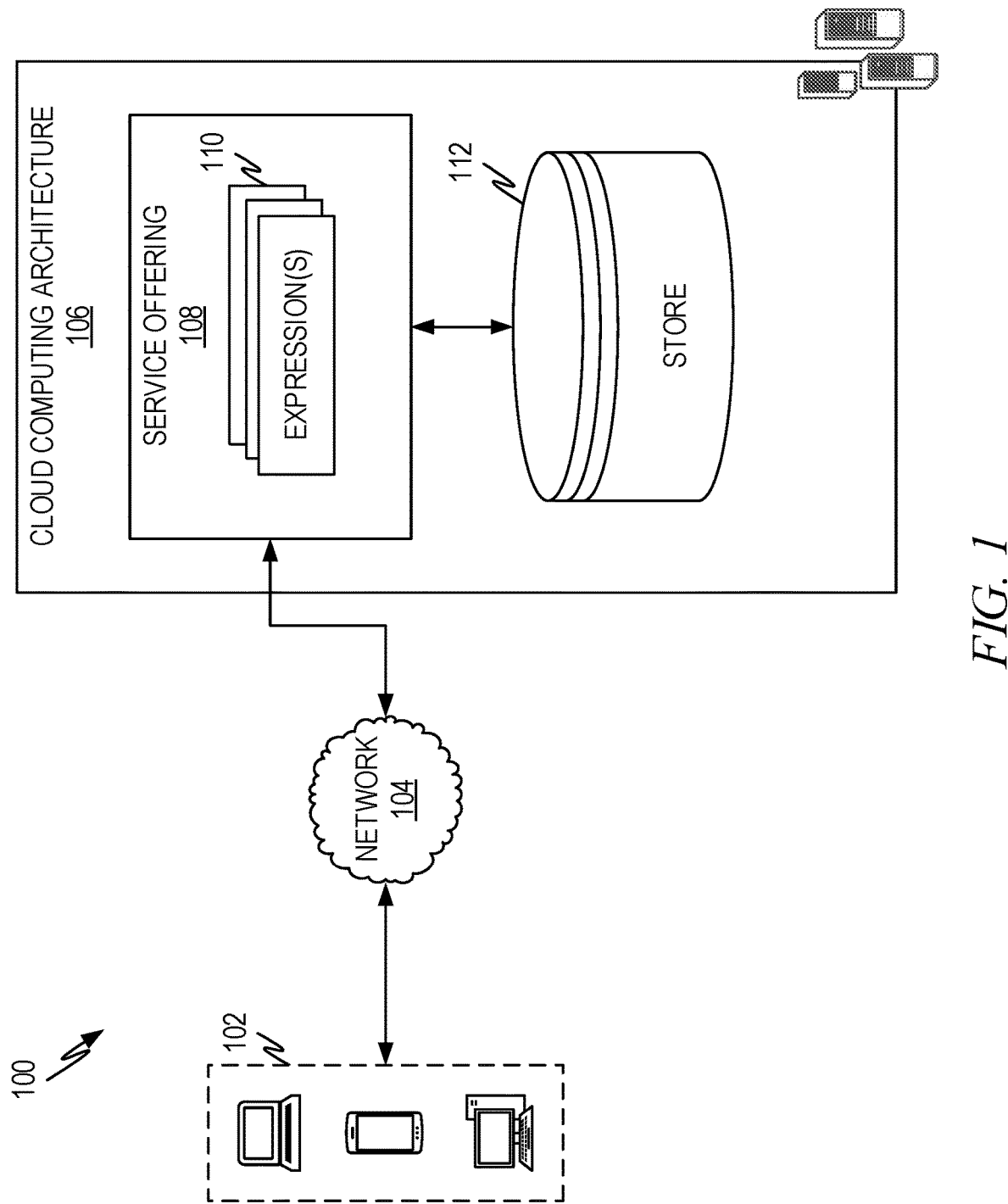
FIG. 1 illustrates an example architecture of a system utilizing expressions.

FIG. 1 illustrates an example architecture 100 of a system offering expressions. As used herein, expressions include metaprogramming expressions, where code is treated as data, as well as filters, queries, rules, policies, or other similar structures that are designed to select data or perform an action. Sometimes expressions are executed when a condition or set of conditions are met. In the architecture 100 of FIG. 1, expressions 110 are used by a service offering 108. Depending on the service offering 108, expressions 110 can persist for a period of time. In some instances, expressions 110 can exist for an extended period of time and need to be available for use by the service offering 108 throughout that time. Example service offerings include business intelligence, data analysis, digital assistants, subscription/notification services, and numerous other types of service offerings. As a few representative examples of expressions, consider the following:

1. "inform me when the sales levels for the western region reach $100,000 for any given day."
2. "tell me the weather in Seattle."
3. "identify articles relating to solar energy advancements and forward them to me."
4. "when the temperature alarm for vessel 11 is triggered, collect data from sensors 8a, 9b and 10c, save the data to the log file, and send a notification to the plant manager."
5. "send me the scores for the Colorado Rockies after each game."

These expressions are written in English rather than a programming and/or query language in order to illustrate the concepts herein in a simple understandable way. However, expressions are typically crafted in some sort of programming, script, and/or query language. Numerous other examples of expressions could be given. In general, an expression can be considered to be any type of "code" that is kept around for execution by a service, program, and so forth. Depending on the service offering and the number of users, the expressions hosted by a particular cloud service can reach very large numbers including millions, tens of millions or hundreds of millions. Thus, effective and efficient storage of the expressions is an important consideration.

If expressions are not frequently used, they can be swapped out to slower storage, such as a data store 112. However, in some instances, response time is important and keeping expressions out on disk is not a great solution, as moving things to external storage can result in a delay to retrieve the desired expression so it can be executed. Other instances where keeping expressions in memory may make sense is where multiple expressions share a large part of the query. For example, "tell me the weather in Seattle if it is raining" and "tell me the weather in Seattle if it is sunny" share a large part of the query with only "sunny" and "raining" being the difference. Keeping the query in memory can help optimize the expressions. Thus, in memory storage solutions are often better in some sense, but keeping large numbers in memory can result in significant memory usage and cost.

The service offering 108 typically resides on, or is executed on, a cloud service computing architecture 106, since it provides the benefit of scaling up or down as the demand expands or contracts. However, the embodiments here can be executed on a single machine or a cluster of machines operating in a non-cloud type architecture.

User devices 102 access the service offering 108 over a network 104 as illustrated.

Figure 2:
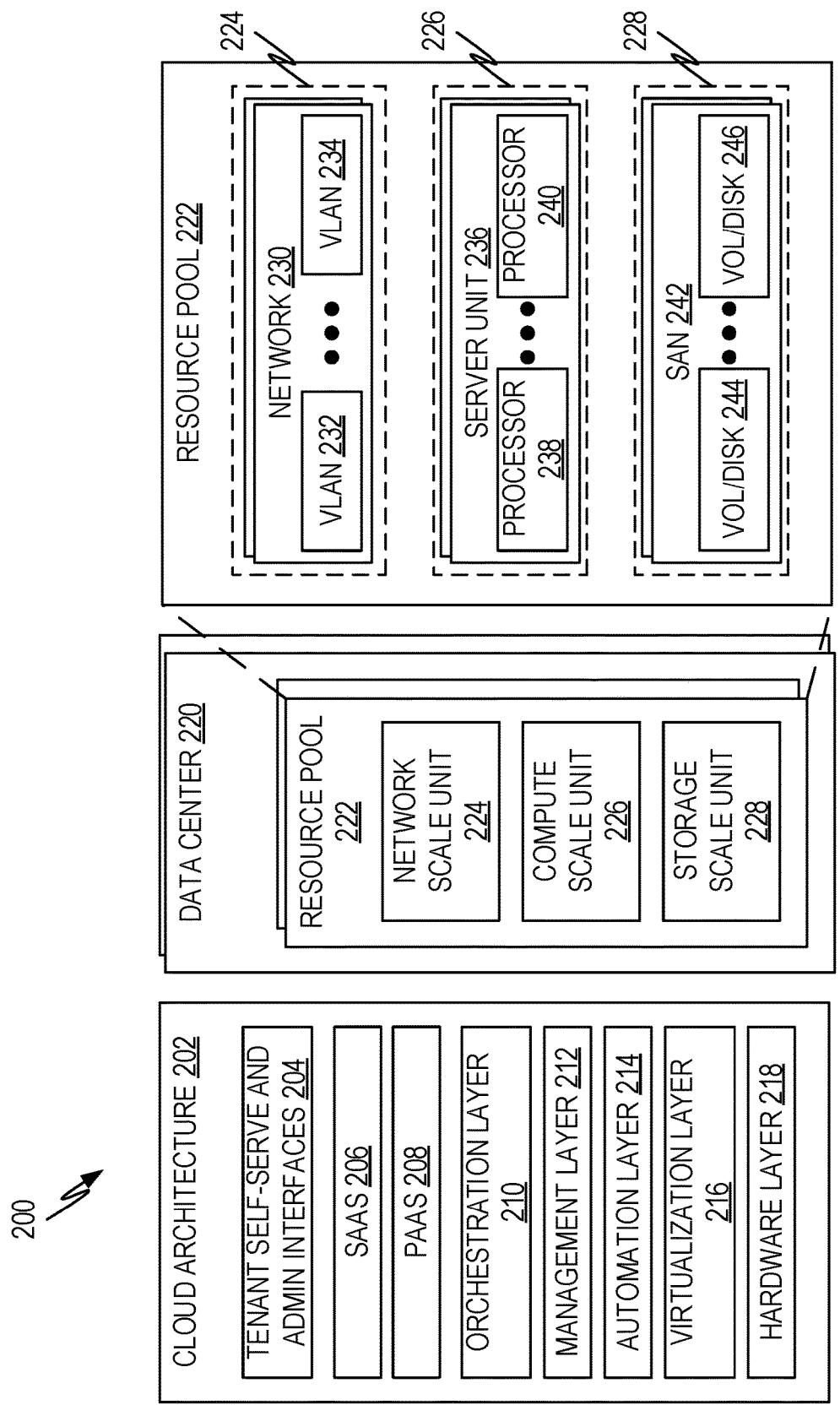
FIG. 2 illustrates an example of a cloud architecture.

FIG. 2 illustrates an example of a cloud architecture 200. The architecture 200 of FIG. 2 represents a suitable environment for implementation of the embodiments described herein. This architecture 202 represents how a cloud architecture typically appears to a user, developer and so forth. The architecture is generally an abstracted representation of the actual underlying cloud architecture implementation. For example, the cloud architecture 202 comprises a plurality of layers, that represent different functionality and/or services associated with the cloud architecture 202.

The hardware layer 218 includes the data center facilities and mechanical systems as well as the storage, network and computing infrastructure. Each of these elements provides enabling management interfaces to interact with higher levels of the architecture.

The virtualization layer 216 represents the virtual machines, virtual networks, containers, and so forth utilized in cloud computing architecture. This layer allows these virtual components share volumes, disks, computing resources and so forth. It is part of the capability that provides resource pooling and the elasticity associated with cloud computing.

The automation layer 214, the management layer 212 and the orchestration layer 210 build from most granular to the widest breadth in terms of IT process automation. The automation layer 214 provides the foundational technologies and services that allow an interface between higher level management systems and the virtual and physical resources.

The management layer 212 provides services that leverage the automation layer 214 technologies to perform management tasks such as checking for patch compliance, deploying patches, verifying installation and so forth. The management layer 212 provides basic process automation usually limited to one particular aspect of the server management lifecycle such as deployment, patching, monitoring, backup and so forth.

The orchestration layer 210 binds multiple products, technologies, and processes to enable end-to-end IT process automation. The orchestration layer 210 helps create and/or run IT workflows that automate complex tasks such as cluster deployment, host patching, virtual machine provisioning, and so forth.

The platform as a service (PAAS) layer 208 may include various platform type offerings such as a database, database management systems, testing tools, deployment tools, directory services and so forth. The software as a service (SAAS) layer 206 may include various service offerings such as email/instant messaging, business applications, social network, office productivity and automation, virtual desktops and so forth.

The tenant self-service and administrator interfaces layer 204 represent those services and/or interfaces that are offered to users to provide self-help type functionality. For example, this layer may provide the functionality that allows a user to delete spilled data, both in terms of the basic functionality described above (i.e., the ability to delete data, empty a trash can, etc.) and the functionality described herein that allows secure deletion of spilled data. In some embodiments, that functionality may be part of the service itself (i.e., data sharing service, email service, etc.). In some embodiments, that functionality may be part of the cloud service architecture. In yet other embodiments combinations thereof are used.

Embodiments of the present disclosure will typically be implemented in one or more of these layers. In particular, as described below, the embodiments can be implemented in conjunction with operating systems (i.e., as part of the hardware and/or virtualization layers) where the system compresses the expressions according to the embodiments described below. Additionally, or alternatively, they can be implemented at other layer(s) within the cloud architecture.

The data center 220 is a representation of the various resource pools 222 along with their constituent scale units. This data center representation illustrates the scaling and elasticity that comes with the cloud computing architecture. The resource pool 222 is comprised of server (or compute) scale units 226, network scale units 224 and storage scale units 228. A scale unit is a server, network and/or storage unit that is the smallest unit capable of deployment within the data center. The scale units allow for more capacity to be deployed or removed as the need increases or decreases.

The network scale unit 224 contains one or more networks 230 (such as network interface units, etc.) that can be deployed. The networks 230 can include, for example virtual LANs 232, 234. The compute scale unit 226 typically comprise a unit 236 that contains a plurality processing units, such as processors 238, 240. The storage scale unit 228 contains one or more storage devices such as disks, storage attached networks (SAN), network attached storage (NAS) devices, and so forth. These are collectively illustrated as SAN 242. Each SAN 242 may comprise one or more volumes, disks, and so forth 242, 246.

Figure 3:
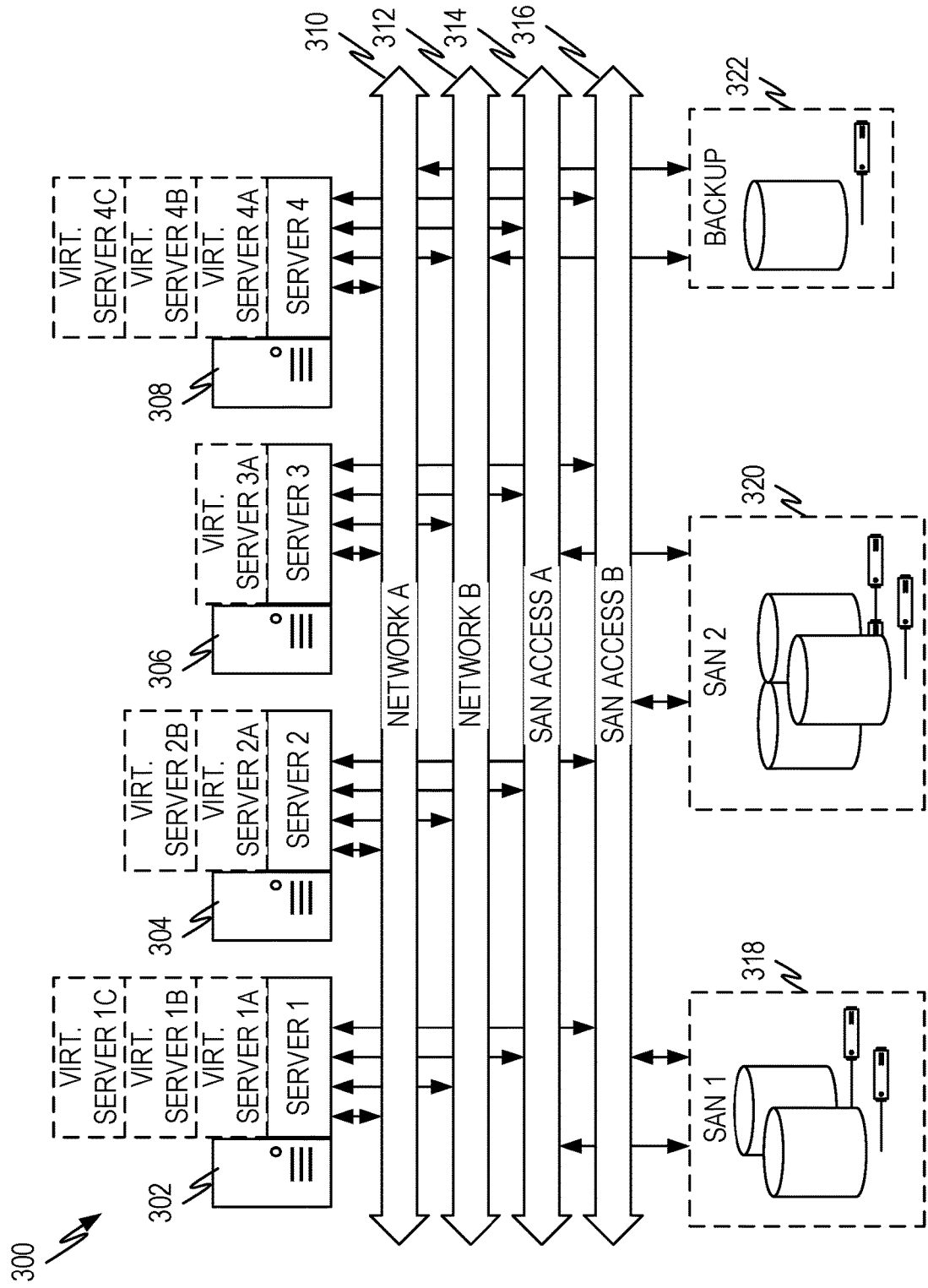
FIG. 3 illustrates another an example of a cloud architecture.

FIG. 3 illustrates another view of an example of a cloud architecture 300. This view is more hardware focused and illustrates the resources underlying the more logical architecture of FIG. 2. A cloud computing architecture 300 typically has a plurality of servers or other systems 302, 304, 306, 308. These servers comprise a plurality of real and/or virtual servers. Thus the server 302 comprises server 1 along with virtual servers 1A, 1B, 1C and so forth.

The servers are connected to and/or interconnected by one or more networks such as network A 310 and/or network B 312. The servers are also connected to a plurality of storage devices, such as SAN 1 (318), SAN 2 (320) and a backup 322. While the backup 322 is typically implemented via a SAN or other such storage device, it is called out separately here for purposes of explanation. SANs are typically connected to the servers through a network such as SAN access A 314 and/or SAN access B 316.

The compute scale units 226 of FIG. 2 are typically some aspect of servers 302, 304, 306 and/or 308, like processors and other hardware associated therewith. The network scale units 224 typically include, or at least utilize the illustrated networks A (310) and B (312). The storage scale units typically include some aspect of SAN 1 (318), SAN 2 (320) and/or backup 322. Thus, the logical cloud architecture of FIG. 2 can be mapped to the physical architecture of FIG. 3.

Services and/or other implementation of the embodiments described herein will run on the servers and/or virtual servers and utilize the various hardware resources to implement the disclosed embodiments.

Figure 4:
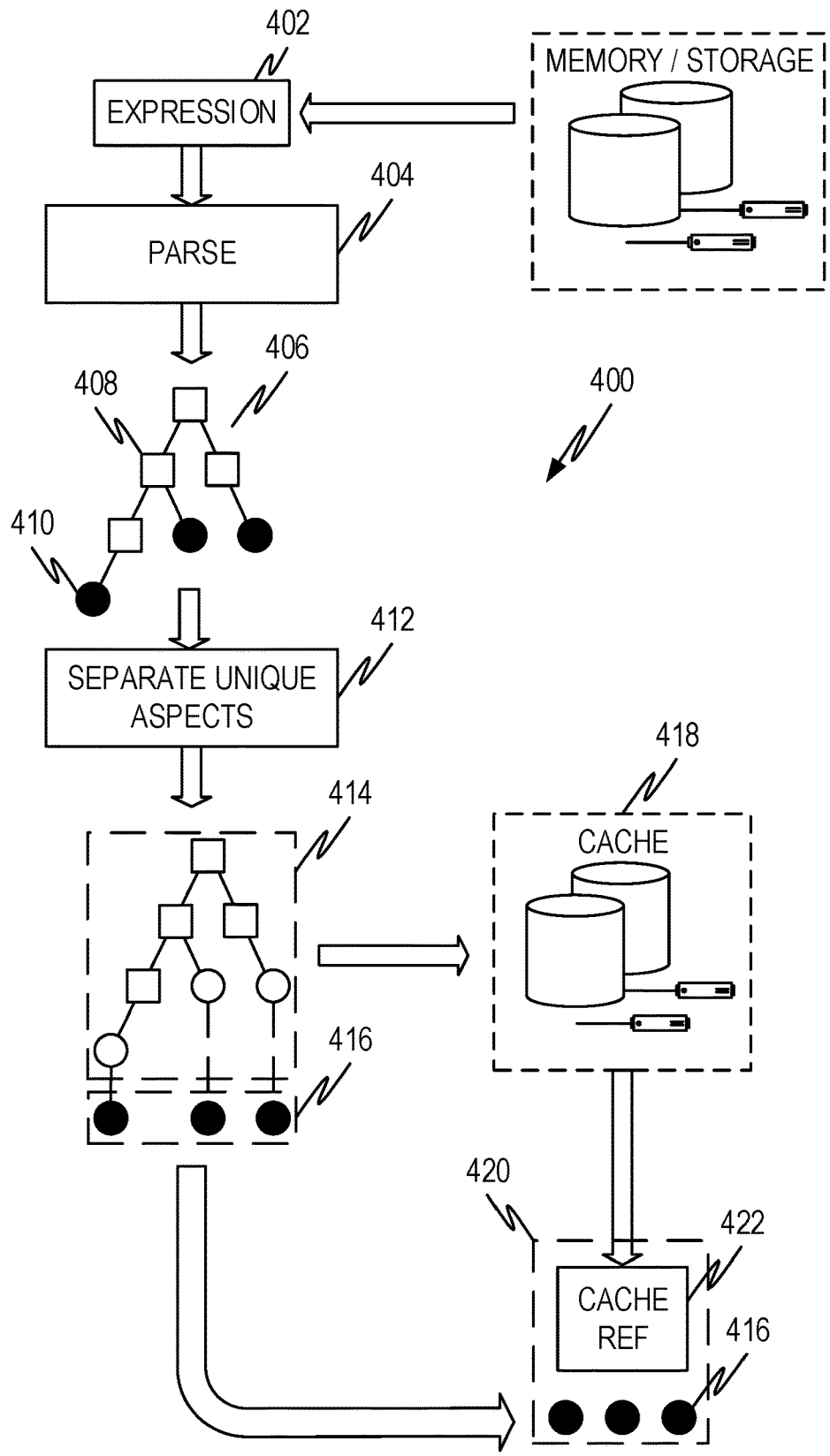
FIG. 4 illustrates an example diagram of compressing expressions.

FIG. 4 illustrates an example diagram of compressing expressions. Expressions, such as expression 402, typically have common forms. In other words, expressions typically have a variety of details, but many share a common template. For example, the difference between "tell me when it is raining" and "tell me when it is sunny" differ only in the particular detail of "raining" or "sunny" but are otherwise similar and/or the same. Expressions from a particular domain typically have many similarities that can be used to reduce the storage used to store expressions while keeping access times relatively quick. Said another way, expressions from a particular domain typically have a few templates, when compared to the number of expression instances that are hosted by a particular service.

As expressions are or can be implemented using a programming language, script language and/or query language, expressions can be parsed and turned into a syntax tree. In this disclosure this syntax tree will be referred to as an expression tree and can be any representation that illustrates the operations performed by the expression as well as any "data" (i.e., details) used by the expression. In other words, the expression tree is a common format for the expressions in a system that identifies any combination of the operations, flow, and data of an expression. Thus, in FIG. 4, the parse operation 404 turns the expression 402 into expression tree 406. As noted above, the expression tree doesn't necessarily have to be a "tree" or store data in a tree format. However, a tree is often used to represent the syntax of a program (i.e., executable code) and can be used in some embodiments as the expression tree representation.

The expression tree 406 contains both portions that are not likely to change (i.e., in another expression) as well as the portions that are likely to change. Various strategies can be used to separate out the unique aspects (i.e., aspects that are likely to change) from the template (i.e., aspects that are not likely to change). This is illustrated by operation 412. The process of separating out the unique aspects from the template is sometimes referred to as "hoisting." Various strategies to identify the template from the unique aspects are discussed below.

In FIG. 4, the template is illustrated by 414 while the unique aspects are represented by 416. The template 414 is stored in a cache 418 and a cache reference 422 is obtained. The cache reference 422 and the unique aspects 416 are combined into a "bundle" 420. The bundle 420 represents the expression 402 without loss of data while taking less memory than the expression 402. Furthermore, use of cache 418 typically allows less delay in reconstituting the original expression than if the expression was swapped out to disk.

The cache requirements for templates and bundles can differ and the caches used to store templates and bundles can be created to take advantage of these differences. For example, templates generally need to be readily available, not only for rehydration as discussed below, but also for comparing to new expressions and the compression process. Bundles, on the other hand, are accessed less frequently (e.g., during rehydration only). In some embodiments bundles are rehydrated in bulk (i.e., many bundles at the same time). Bundles also tend to lend themselves well to columnar storage in a table. Thus, for efficient rehydration in bulk, the homogenous schema of bundles utilizing the same/similar template, the bundles can be stored one row per instance and one column per hoisted constant, variable, etc. Thus, the varying characteristics can inform not only cache design but cache policy as well when it comes to storing bundles and templates.

Cache 418 can be any type of cache suitable to the implementation. For example, in the context of a cloud service implementation, cache 418 may rely on cache memory in a processor, server, and so forth. Cache 418 can be a single level cache, multi-level cache, or other cache type structure. Furthermore, cache 418 can be managed according to any desired strategy, such as a Least Recently Used (LRU) strategy where the least recently used items are removed and/or transferred to a lower level cache to make room for newly cached items. Other strategies are known in the art and the embodiments herein are not limited to any particular cache and/or cache management strategy unless specifically indicated.

Rehydration is the process of recovering the original expression 402 from the bundle 420 and is performed by reversing the process just described. Rehydration is discussed in greater detail below.

Figure 5:
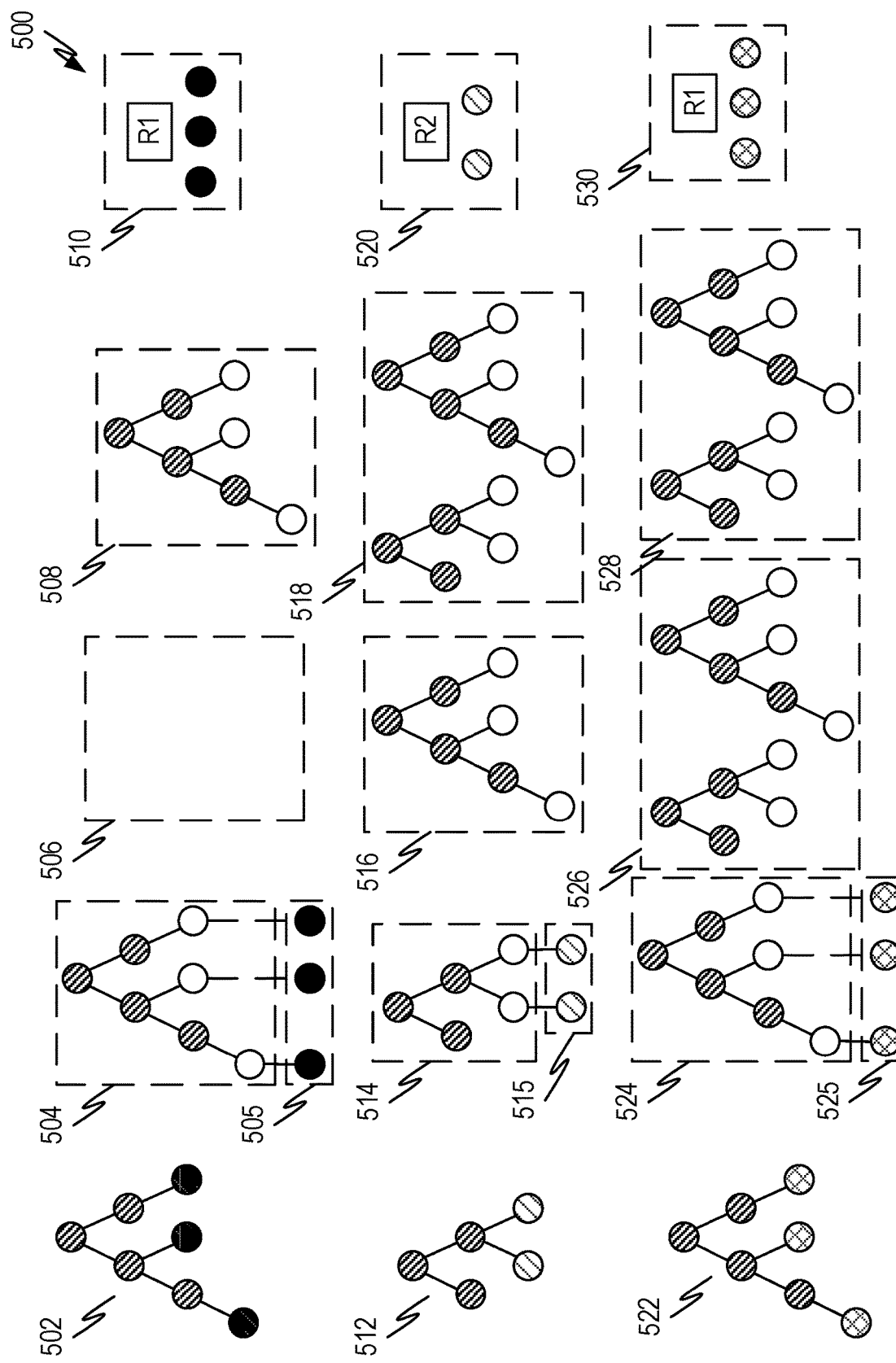
FIG. 5 illustrates another example diagram of compressing expressions.

FIG. 5 illustrates another example diagram 500 of compressing expressions. The diagram 500 illustrates how the cache (i.e., cache 418 of FIG. 4) is changed as various expressions are compressed into bundles using the disclosure herein.

At time T1, expression 502 is compressed into bundle 510. The system first hoists expression 502 to identify the template portions 504 and the unique portions 505 of the expression. In this example, the cache is initially empty as shown by 506 and the system stores the template 504 into the cache as illustrated by 508. The bundle 510 is then crated with the cache reference (R1) and the unique portions as illustrated.

At time T2, expression 512 is compressed into bundle 520. The system hoists the expression 512 into template 514 and unique portion 515. The cache already contains the template from expression 502 as illustrated by 516. The system compares the template 514 to the templates stored in the cache 516 (i.e., template 504) to see if a match exists. This can be accomplished by comparing signatures as discussed below, using a hash of the template as a cache key, or in other ways. Since template 514 does not match template 504, template 514 is stored into the cache as illustrated by 518. A reference (R2) is obtained to template 514 and the bundle 520 created from the cache reference (R2) and the unique portions 515.

At time T3, expression 522 is compressed into bundle 530. Again the expression 522 is hoisted into template 524 and unique portion 525. The system compares template 524 to the templates stored in the cache (504 and 514) as illustrated by 526. Since template 524 matches template 504, nothing is added to the cache (528) and the reference to the matching template (R1) is obtained. The bundle 530 is then created from the reference (R1) and the unique portions 525.

Figure 6:
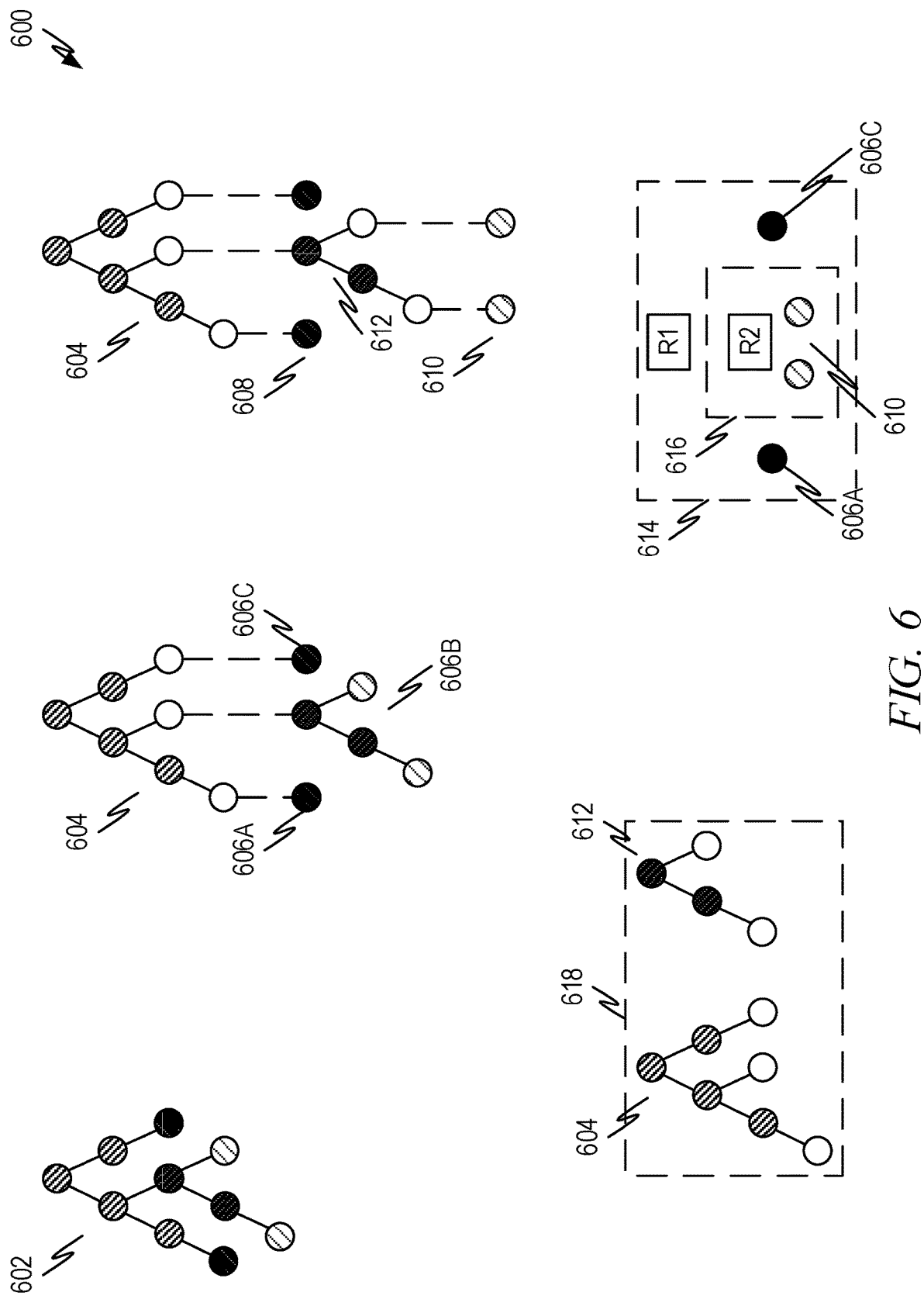
FIG. 6 illustrates an example diagram of compressing an expression into a nested bundle.

FIG. 6 illustrates an example diagram 600 of compressing an expression into a nested bundle. Although the discussion below separates an expression into a single template, in some instances the system can recursively hoist the unique components from a hoisted expression and the resultant compression has multiple links from the cache and multiple unique portions from the original expression.

The original expression 602 has a plurality of ways that it might be compressed into a bundle. In this instance, the system first hoists the expression 602 into a template 604 and three unique portions, 606A, 606B and 606C. The unique portion 606B is a complete subtree. In the methodologies and embodiments described herein, it doesn't matter if the unique portions are individual nodes or entire subtrees. This is explained in more detail below.

The template 604 is stored in cache 618 and a reference (R1) is obtained. Thus, before the second hoisting, the "outer" bundle comprised of a reference to the template 604 (R1), and the three unique portions 606A, 606B, 606C.

The middle subtree, 606B, can be hoisted again as shown in FIG. 6. After the middle subtree 606B is hoisted, it is broken down into the template 612 and the two unique nodes 610. The template 612 is stored in the cache 618 and the "inner" bundle 616 is created from the reference to the template 612 (R2) and the two unique items 610. Thus the entire bundle 614 has the reference to the first template 604 (R1), the two unique outer nodes 606A and 606C and the inner bundle 616 that has a reference to the template 612 (R2) and the two unique nodes 610.

Thus, embodiments herein can perform multiple rounds of hoisting in order to create "nested" bundles. When rehydrating a nested bundle, the rehydration process can start either from the outer bundle or the inner bundle, as both will work.

When a bundle (either nested or non-nested) is created from one or more cache references and one or more unique portions, the positional information can be retained so that during rehydration, the unique portions can be placed into the proper nodes of the template referenced by the cache reference. Thus in the example of the nested bundle 614 of FIG. 6, the unique portion 606A, the inner bundle 616 and the unique portion 606C can include positional information either explicitly or implicitly to allow the rehydration process to associate the appropriate unique portion with the appropriate node in the template.

Explicit location information should be relatively easy to understand. Thus, explicit location information can be stored as part of the bundle, as part of metadata associated with the bundle, and so forth.

Implicit location information can rely on a particular "packing" and "unpacking" order to identify what goes where. For example, if the nested bundle were stored in the order: [R1;606A;R2;610;610;606C], it can be rehydrated by working left to right, without any explicit order information. Thus, to rehydrate, the system would first retrieve the template referenced by R1 (i.e., template 604). This template has three locations where unique information needs to be replaced (i.e., illustrated by the empty nodes in the template 604). The next item is retrieved and placed in the left most node location. In this case, the unique portion 606A would be placed in the left most node location.

The next item in the storage is cache reference R2. The template 612 referenced by R2 would be retrieved and its root node placed in the next (i.e., center) open location in template 604. This results in the "subtree" represented by the template 612 being placed in the 'center' open node of the template 604.

The rehydration process, still proceeding left to right, would then rehydrate the subtree represented by the template 612. Thus, the left most open node of the subtree/template 612 would be filled with the next item retrieved from storage, which is the first unique portion 610 (i.e., the node on the left). The next item retrieved would be the second unique portion 610 which would be placed in the next open node of the subtree/template 612.

The rehydration process then goes to the next open node, which is the right most open node of the template 604 and places the next retrieved item (i.e., 604C) in that node. At this point the bundle is empty and the original expression tree has been rehydrated.

Although this rehydration process is based on the particular storage order identified above, the "bundle" can be stored in other formats and/or orders that would then cause commensurate changes to the rehydration process. For example, the rehydration process may be based on a depth first traversal or any other type of traversal. All that is needed is to be able to replace the hoisted portions into the template in their original locations. Further discussion of rehydration is presented below.

Figure 7:
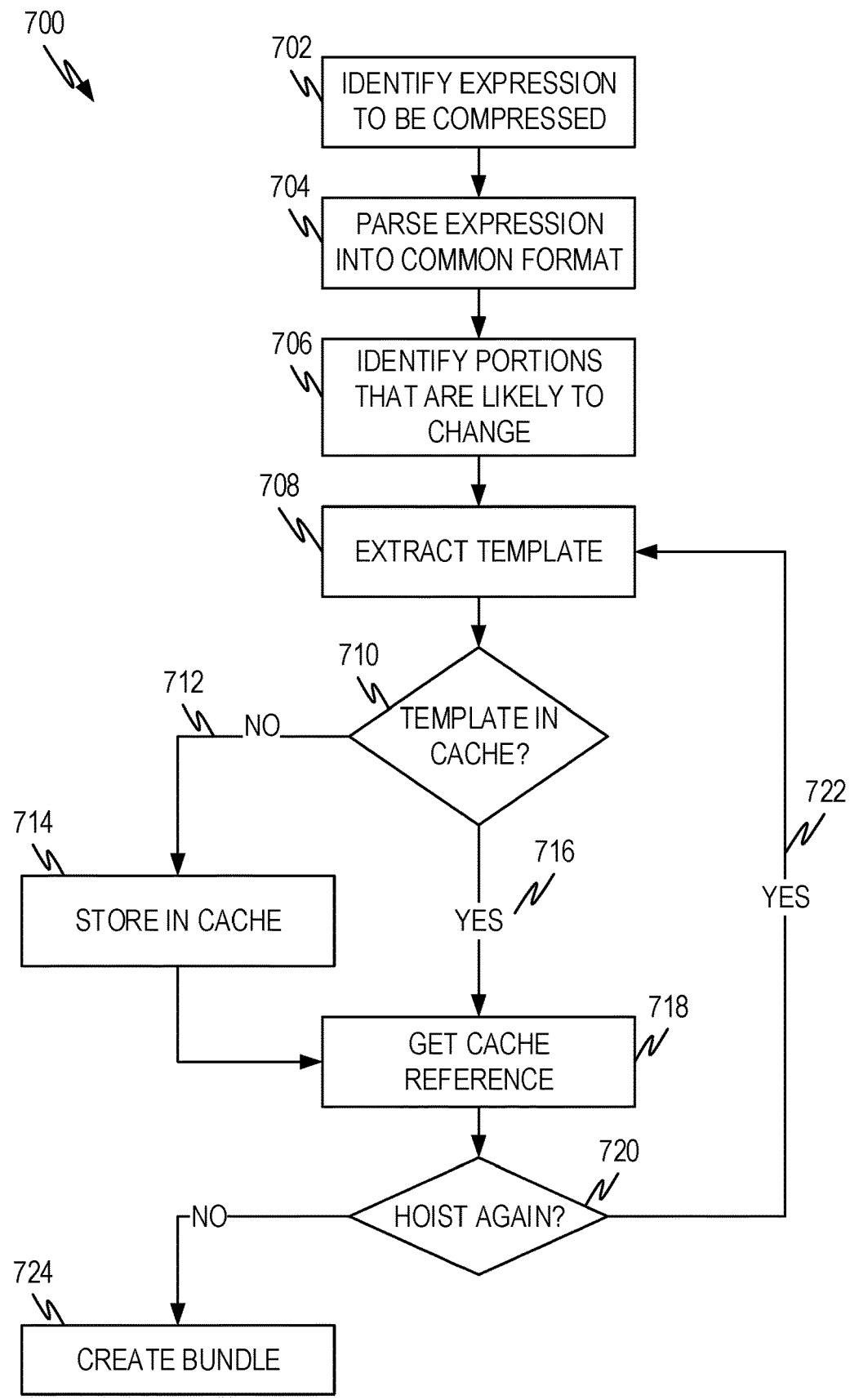
FIG. 7 illustrates an example flow diagram of compressing expressions.

FIG. 7 illustrates an example flow diagram 700 of compressing expressions. In operation 702 an expression to be compressed is identified. Since the compression process 700 can operate independently of any execution of expressions, the process 700 can be performed offline, or in the background, much like cache maintenance, garbage collection, or any other maintenance process. The compression process 700 can be triggered by a number of criteria, that are not necessarily mutually exclusive. For example, the compression process 700 can be triggered based on a periodic or aperiodic schedule, according to a timer, based on a system event (such as memory usage above a given threshold, an 'idle time' measure indicating an expression hasn't been accessed in a given time period, a time since last access time metric, and so forth), a combination of system events, or any combination thereof.

Operation 702 can be set to loop over all expressions that have not yet been compressed or can be set to select expressions based on a particular criteria or set of criteria. For example, if an expression hasn't been triggered in some time period (i.e., the time since list trigger/access exceeds a threshold), a frequency of use count (or other use metric) is below a threshold, the system predicts that the compression factor (i.e., memory occupied by the uncompressed expression compared to the estimated memory occupied by the compressed expression) is above a particular threshold, and/or any other criteria or combination of criteria, the system can select the expression for compression.

Once an expression is selected for compression, operation 704 parses the expression into a common format, such as the expression trees previously discussed. Although expression trees have been given as a representative example, any common format that lends itself to separation of a template (i.e., portion unlikely to change) from unique aspects (i.e., portion likely to change) can be used.

Once operation 704 is complete, the hoisting (operation 706) identifies the portions that are likely to change and those portions that are unlikely to change. A couple of example processes of how this might be accomplished are discussed below.

Operation 708 extracts the template (i.e., portion unlikely to change) from the expression tree and checks to see if the template is already in the cache (operation 710). Processes to perform this check are discussed below.

If the template is already in the cache, the "yes" branch 716 is taken and the cache reference is retrieved in operation 718. Otherwise, if the template is not in the cache, the "no" branch 712 is taken and the template is stored in the cache in operation 714 and the cache reference is obtained in 718.

The system can then store the unique portions with the cache reference (i.e., operation 724) or can hoist the expression again as explained in conjunction with FIG. 6 in operation 720, which shows a loop 722.

Note that although operation 724 is shown as creating the bundle after all the hoisting is complete, the bundle can be created in an incremental manner where the references and unique portions are stored as they are extracted so that things are stored in a particular order as discussed in conjunction with FIG. 6.

Figure 8:
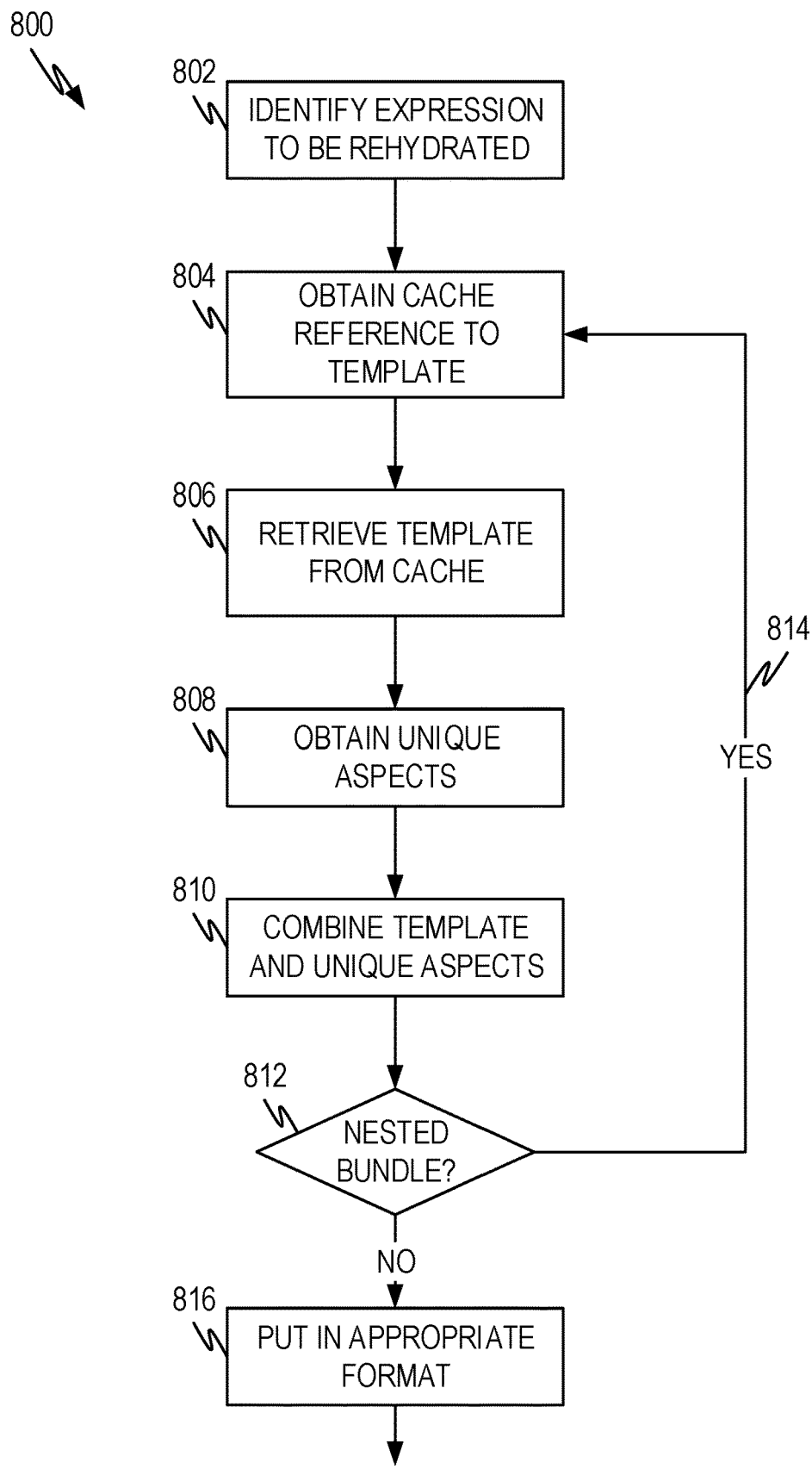
FIG. 8 illustrates an example flow diagram of decompressing expressions.

FIG. 8 illustrates an example flow diagram 800 of decompressing expressions. The decompression process 800 is also referred to herein as rehydration. The rehydration process can be triggered in a variety of ways. For example, the rehydration process may be triggered when the system needs to invoke/execute an expression. Alternatively, the rehydration process may be invoked periodically or aperiodically and any expressions that are likely to need rehydration can be rehydrated at that time.

In other examples, some embodiments may utilize metrics, system event(s), and/or other criteria to invoke the rehydration process 800. For example, the system may have scheduled times when certain expressions are invoked. Thus if the expression is "deliver the headline news for my location each morning," the system can identify where the user is located and know that the expression will be invoked at 6:00 am local time for the user. In these type of situations, the system may be able to ascertain when an expression will be or is likely to be invoked and invoke the rehydration process 800 in time for the expression to be utilized.

Historical usage (i.e., when or how often) an expression is invoked may give the system a way to predict when the expression is likely to be invoked and trigger the rehydration process before that point. So the system can track invocation times and ascertain patterns to the invocation using a variety of known algorithms to identify when the algorithm is likely to be invoked. For example, if the system creates a histogram of invocation times, the histogram can be converted into a probability distribution that can be used to determine the likelihood of invocation based on the histogram variable (i.e., time of day, time of month, time of year, time since last invocation, etc.).

In other embodiments, predicting when an expression is likely to be invoked can rely on different and/or additional methods/criteria.

When invoked, the rehydration process identifies the expression to be rehydrated in operation 802. If, for example, the rehydration is based on a periodic or aperiodic invocation schedule, operation 802 would use criteria such as those specified above (i.e., which expressions are likely to be invoked, or other criteria above). If, on the other hand, the rehydration process 800 was invoked specifically because a particular expression (or group of expressions) are being invoked or likely to be invoked, then operation 802 can identify which expression or group of expressions fit that criteria and select the next expression on the list.

Operation 804 obtains the cache reference from the bundle and operation 806 retrieves the template from the cache. The unique aspects are obtained in operation 808.

If all the information needed to recreate the expression has been obtained, any intermediate format (i.e., an expression tree or other intermediate format) can be recreated and the expression put into the appropriate format, such as the programming, query or other language used by the system, in operation 816.

If the bundle is nested, then operation 812 loops back to operation 804 so that the subtree can be extracted and rehydrated.

The operations of rehydration process 800 can also be rearranged as described in conjunction with FIG. 6 in order to allow rehydration in a more incremental fashion as explained above.

Figure 9:
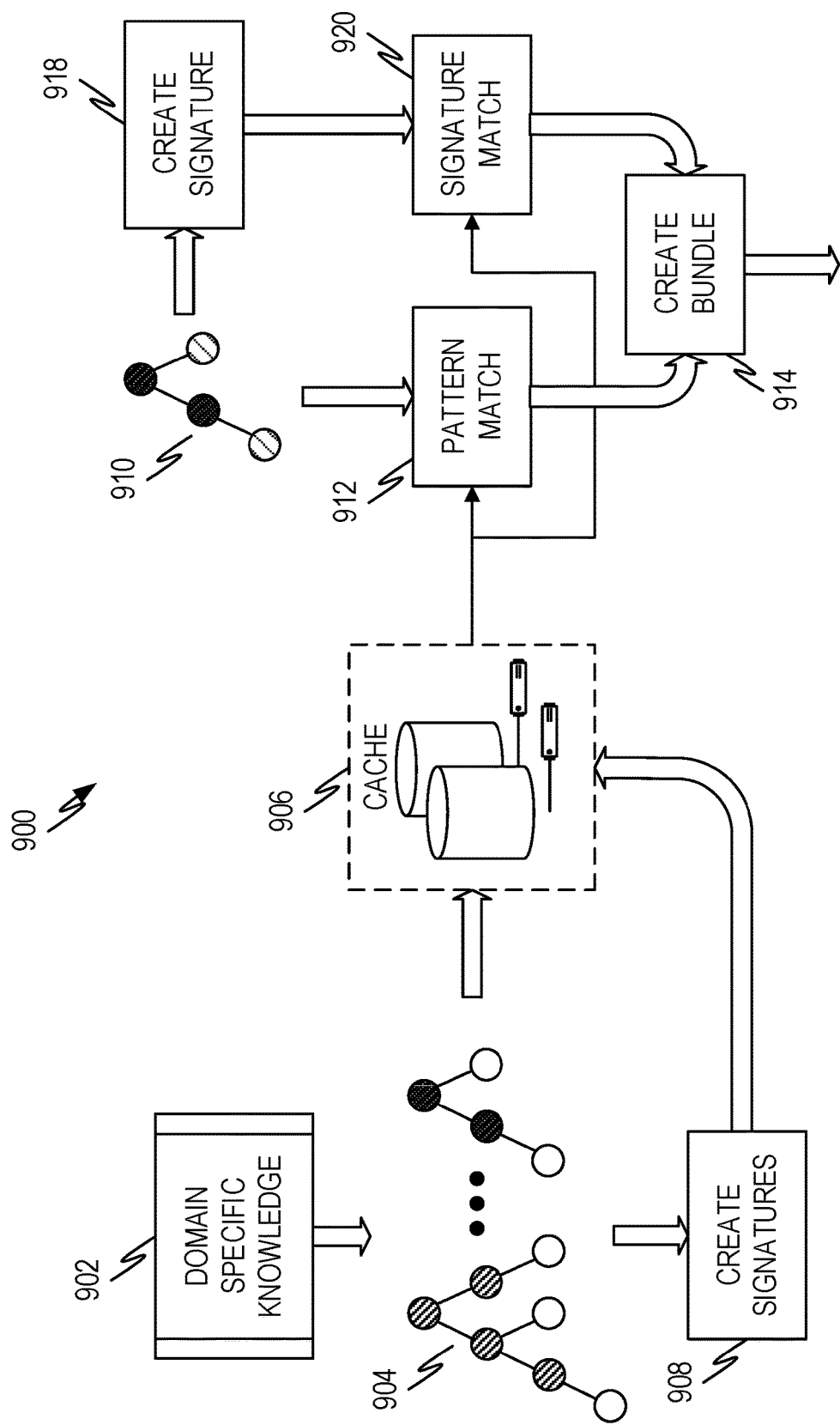
FIG. 9 illustrates a representative example of identifying common portions and unique portions of expressions.

FIG. 9 illustrates a representative example 900 of identifying common portions and unique portions of expressions. In this representative example 900, identifying templates can be accomplished by using domain specific knowledge 902. Domain specific knowledge is any knowledge about the particular formats or types of templates that are used or likely to be used. By way of example only, in certain environments and systems, the type of templates that can be used are limited, either by the system or by what a user is likely to ask for. For example, consider a digital assistant system. In these systems, the actions a user can perform typically represent a closed set. Thus a user may ask the system for the weather in a particular location, but may not be able to ask the system to order a pizza. Where the types of actions a user can perform or ask the system to perform, a set of templates 904 may be created by creating templates for the members of the closed set. This creates a lot of up front work, but allows tuning of the compression by how the templates are created.

As another alternative to incorporate domain specific knowledge during template creation is to provide an application programming interface (API) (not shown) to allow users of the system to create a template, much like a stored procedure or user-defined functions. The API can provide a general purpose mechanism to feed directly into the system. In other words, a user can invoke an API to initiate the process described in FIG. 7, FIG. 9 or other areas where expression compression is performed. The API would contain an argument list that would become part of the bundle upon invocation of the API. However, these parameters (i.e., the argument list) themselves can be optimized further in many instances, such as where the arguments themselves are expressions. In addition, for arguments that are templates, the system may further optimize them (e.g., hoist out portions that are common/unique as the system learns which are common/unique) such as when many procedures are defined (i.e., through the API) share common pieces.

Another way that domain knowledge can be used to identify portions that are not likely to change (i.e., templates) can be used either with the embodiment in FIG. 9 or the embodiment described in FIG. 10 below. Domain specific knowledge 902 may give information about the types of variables, constants, strings and other types of parameters (collectively parameters) used in expressions. Thus, domain specific knowledge may yield information about which parameters are equivalent and which are not. For example, there are situations where constants can look like strings/variables and/or vice versa. Consider an expression that includes a string that determines how the output of the expression should be formatted (i.e., for display or for another reason). On its face, the formatting string is a variable (can change from expression to expression). However, in some domains, expressions commonly use that formatting string, then for purposes of identifying templates in an expression, the string can be treated as a constant rather than a variable. They can thus be treated like constants for the purposes of identifying templates from expressions. Domain knowledge may also be used to identify things that are or appear to be constants that should not be treated as constants for purposes of identifying templates.

Domain knowledge may also give information on whether order of nodes in the expression matter (i.e., can be treated as equivalent for identifying/matching templates and/or unique portions).

In FIG. 9, template set 904 represents the templates created from the closed set of actions. These templates can be created off line and tradeoffs can be evaluated to identify the set of templates that are likely to give the best overall compression performance in the system. Once created, the template set 904 may be fixed and thus act like a fixed code book for compression, or may serve as a starting point for more adaptive systems, as described further below. The template set 904 can be used in the compression process (i.e., operation 706 of FIG. 7) to identify portions that are not likely to change. For example, the template set 904 can operate like a code book having different trees and subtrees that can be matched to an incoming expression using any type of tree and/or pattern matching algorithm to identify portions of the expression not likely to change. Thus, when a tree and/or subtree of the incoming expression tree matches a member of the template set 904, that portion is identified as a template for the corresponding expression. Thus the template set 904 can be stored in order to be used to identify portions of an expression tree that should be identified as templates.

All or a portion of the template set 904 can be stored in the cache 906. In some embodiments, where not all of the template set 904 is stored in the cache 906, the cached portions represent an initial cache state that can then evolve to cache the 'best' subset of the template set 906 according to the selected cache management methodology.

Figure 11:
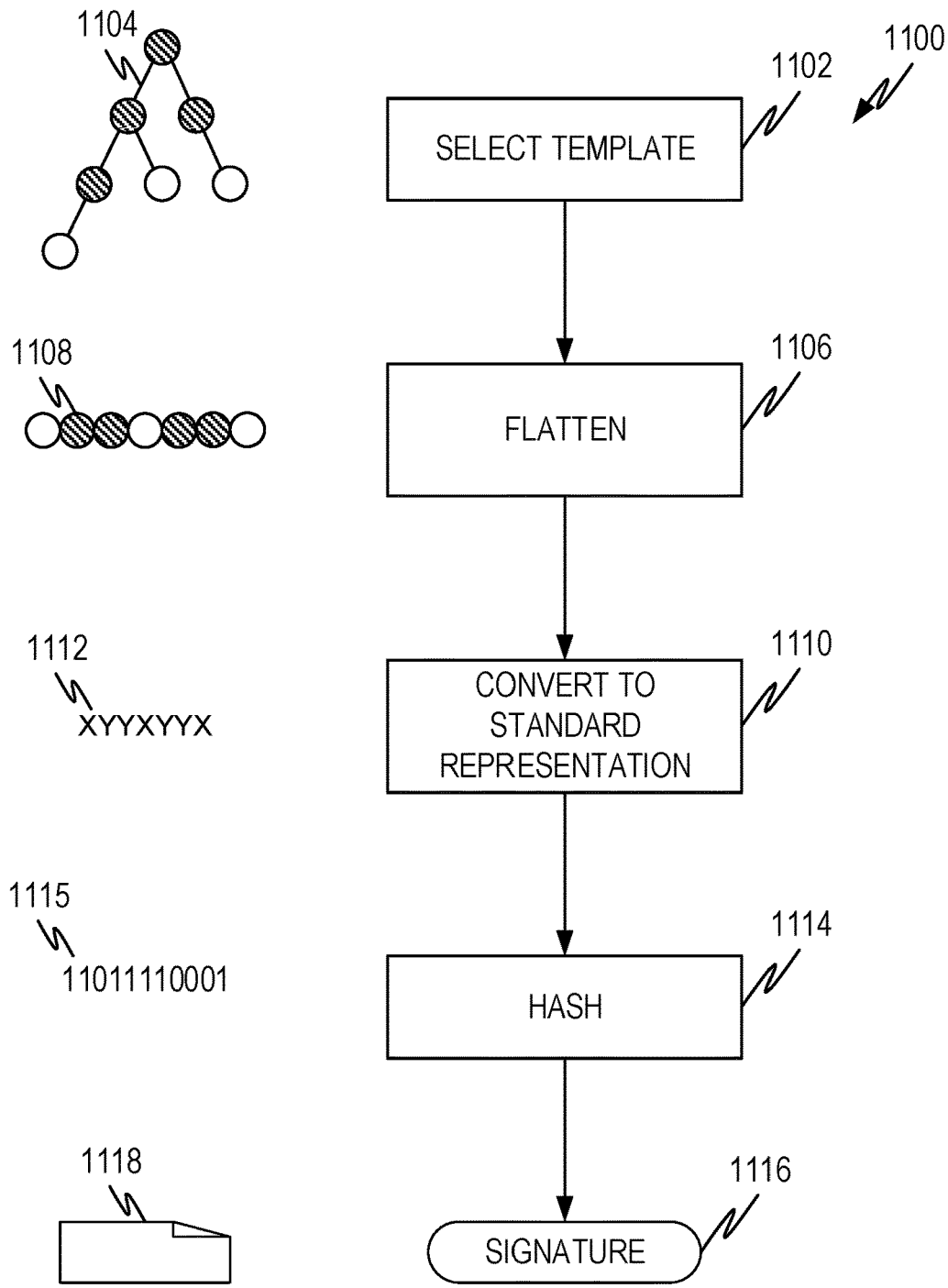
FIG. 11 illustrates a representative example of creating a signature for expressions.

Signatures can be created (operation 908) for the templates to aid in identifying whether a template identified in an expression tree being compressed already resides in the cache. In this sense a signature is a fingerprint or other identifier that is associated with a template. Good signatures are unique or so likely to be unique as to have a minimal risk of collision (i.e., two different templates generating the same signature). Numerous algorithms exist and are known to those of skill in the art that will generate appropriate signatures. FIG. 11 gives a representative example of how signatures can be created. As illustrated in FIG. 9, signatures can be stored in the cache, stored in a separate cache (and linked to a cached template), or otherwise associated with a corresponding cached template in a manner that allows quick retrieval of a corresponding cached template from a template signature. In one representative example, the signature can be used as a key to the cache (i.e., a cache reference).

When the compression process, such as compression process illustrated in FIG. 7, identifies a template 910, the system identifies whether the template 910 resides in the cache 906. In one representative example, a pattern matching algorithm 912 can be used to identify whether the identified template 910 resides in the cache. In another representative example, a signature of the identified template 910 can be created (operation 918) and the signature can be used to identify whether the template resides in the cache (operation 920) as explained above.

Figure 10:
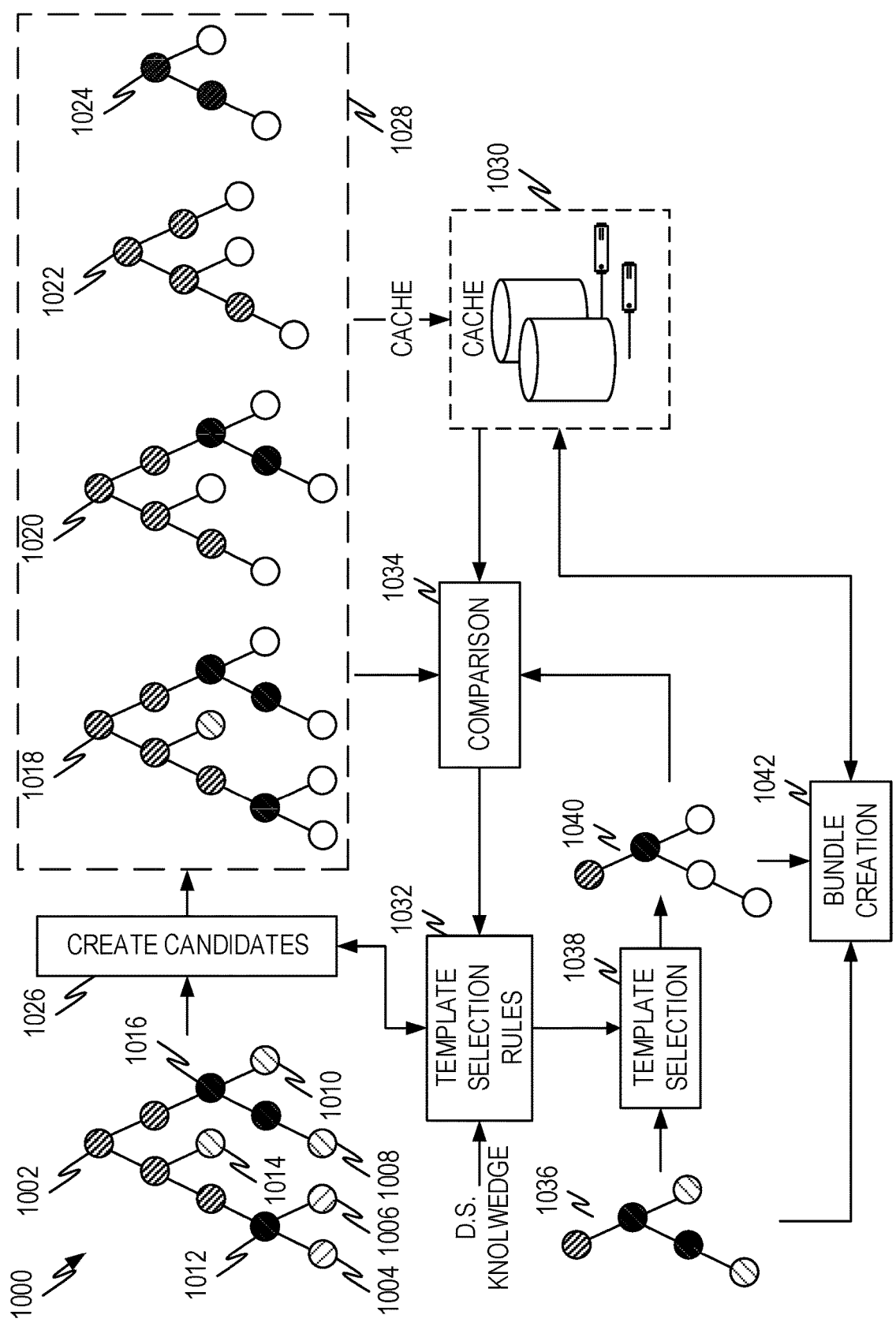
FIG. 10 illustrates another representative example of identifying common portions and unique portions of expressions.

FIG. 10 illustrates another representative example 1000 of identifying common portions and unique portions of expressions. This embodiment has an adaptive nature to it so that how templates are identified from an incoming expression can change over time.

Some embodiments seed the template cache in order to jumpstart the process. One process to seed an empty cache is illustrated in FIG. 10. One way to seed an empty cache is to break down an initial expression into a variety of templates. For example, initial expression 1002. An initial set of candidate templates 1028 can be created (operation 1026) by taking various combinations of trees and subtrees of initial expression 1002. Thus, template 1018 is created by hoisting out the leaf nodes 1004, 1006, 1008, 1010. Template 1020 is created by hoisting out subtree 1012, node 1014 and leaf nodes 1008 and 1010. Template 1022 is taken by hosting out subtree 1012, node 1014 and subtree 1016. Template 1024 is taken by starting with subtree 1016 and hoisting out 1008 and 1010. Other combinations of trees and/or subtrees can be used, but this suffices to serve to illustrate how different candidate templates can be created (operation 1026).

The candidate templates created by operation 1026 can rely on domain specific knowledge and/or an initial set of template selection rules, policies, and/or methods represented by box 1032. A non-exhaustive list of examples of possible template selection rules is:

1. Hoist constants in the expression.
2. Host parameters of a particular type or selected parameters based on:
    i. Position in the expression tree;
    ii. Inclusion of the parameter in a list of 'hoisted parameters';
    iii. Value of the parameter;
    iv. Type of the parameter;
    v. Hoisting the parameter allows the possible template to match a template in the template cache; or
    vi. Other domain specific rule/information.
3. Hoist select constants, where the selection is defined by at least one of:
    i. Position in the expression tree;
    ii. Value of the constant;
    iii. Hoisting the constant allows the possible template to match a template in the template cache; or
    iv. Other domain specific rule/information
4. Hoist free variables in the expression.
5. Hoist selected variables in the expression, where selection is based on at least one of:

i. Position in the expression tree;
ii. Inclusion of the variable in a list of 'hoisted variables';
iii. Value of the variable;
iv. Type of the variable;
v. Hoisting the variable allows the possible template to match a template in the template cache; or
vi. Other domain specific rule/information.
6. Hoist selected subtrees, where the subtree is selected based on at least one of:
   i. Position in the expression tree;
   ii. Inclusion on a 'hoisted expression subtree' list;
   iii. Subtree being found in the cache as the basis of a template;
   iv. Hoisting the subtree allows the possible template to match a template in the template cache; or
   v. Other domain specific rule/information.
7. Look through the cache and/or template history and hoist those parts of the incoming expression that are left once the various available templates are utilized (i.e., hoist those portions of the incoming expression tree that do not match a combination of templates in a template set).

For the most part, the examples above should be self-explanatory. However, a few comments may help clarify a few of the above examples. In this context, a hoisted constant, parameter, subtree, and so forth means that the constant, parameter, subtree, and so forth is identified as a unique portion (i.e., not part of the template) at least for the initial hoisting. As explained above, where subtrees are hoisted, they may also be reevaluated and templates identified in the hoisted subtree so that a nested bundle is ultimately created. Several of the examples say that a constant, parameter, variable, etc. are hoisted if they are on a 'hoisted' list. The 'hoisted' list is a list that contains constants, parameters, variables, etc. as the case may be that the system will select for hoisting if they exist in the candidate expression. Items can be placed on the hoisted list for a variety of reasons and the lists can be created based on some a-priori knowledge (i.e., domain specific knowledge), based on past history (i.e., the system can keep track of items that occur in the incoming expressions and place those on the list that do not occur more than some threshold number of times under the assumption that things that do not occur often should be hoisted as unique), or based on other criteria.

Subtrees that are found in the cache can be hoisted and used to create a nested bundle in some instances. Thus if subtrees are found in the cache as the basis of a template (possibly by hoisting out parameters and/or a subtree), then the subtree can be identified for hoisting and creation of nested bundle enabled.

For the last rule, what the system would do is look at the templates that have previously been selected (either in the cache or in a history) and identify a combination of templates that can be used to compress the incoming expression and hoist the remainder. This rule can further be refined by putting limits on the number of templates that can be used in a combination, selecting the combination that uses the fewest templates, and so forth. The last rule compresses the incoming expressions using a set of templates as a code book, as explained in conjunction with FIG. 9 above. The difference is that in this embodiment, the set of templates can change as explained below.

Although the above template selection rules have been cast in terms of what should be hoisted out of the expression, additionally or alternatively, the template selection rules can identify what should not be hoisted out of the template. By way of further explanation, several of the example rules above state that a parameter, subtree, etc. should be hoisted if it is on a hoisted list. Similarly, a list can be kept of things that should not be hoisted. For example, if a parameter, constant, variable, subtree, etc. occurs frequently (particularly in combination of other nodes of an expression tree), then that parameter, constant, variable, subtree, etc. should not be hoisted and should be left as part of the template. Thus, embodiments can have lists that include things that are seen more than a threshold number of times (alone or in combination with other things) on the theory that things that often appear (particularly in combination with other things) should be left in identified templates. Other rules can identify things that should not be hoisted out and one of skill in the art can readily identify how the example rules above can be modified to identify items that should not be hoisted out of a potential template.

The template selection rules used to create a set of candidate templates 1028, i.e., via operation 1026, for preloading the cache 1030 can also be used as a starting set of template selection rules 1032 in some embodiments. These rules can evolve over time as new expressions are received and evaluated against the rules as explained below.

As a new expression 1036 is received, the template selection rules 1032 can be used by a template selection process 1038 (such as operations 706, 708 of FIG. 7) to identify the parts that should be hoisted out of the expression and/or parts that should left in a template. In the representative example of FIG. 10, the new expression 1036 is similar to things in the cache, but do not quite match. As an example, suppose the rules identify the two leaf nodes and one other intermediate node as candidates for hoisting out of the expression. The template that is left is illustrated as 1040. The template can then be used to create a bundle as indicated in operation 1042 and as previously discussed. Since 1040 is not stored in the cache, the template will be stored in the cache and the cache reference, along with the hoisted nodes will be combined into an appropriate bundle.

Template 1040 can then be used to identify possible changes to the template selection rules. For example, comparison process 1034 can compare the identified template (i.e., template 1040) and/or underlying expression (i.e., expression tree 1036) to templates in the cache 1030, the initial starting candidate set 1028 and/or a history of templates (not shown) to identify similarities and differences from things that have been selected in the past. The history of identified templates can be some form of history of past templates. For example, it can be a complete history of all selected past templates. Thus, the history can keep track of all past templates and keep track of a count of how often the template has been selected. The history can also be a weighted history where older templates are given less weight than newer templates. The history can also be a windowed history where only things in a given lookback period are part of the history and templates older than the window are removed. Combinations of the above can also be used. The purpose of a history is to identify items that are not likely to change. For example, such a history can be used to identify nodes, subtrees and so forth to put on the hoisted and/or not hoisted lists of the rules above.

Additionally, or alternatively, the comparison process 1034 can be used to identify differences between the identified template (1040) and/or the incoming expression (1036) and the cache 1030, the initial starting candidate set 1028 and/or a history of templates (not shown). Analysis of the difference can identify changes to the rules that could be made in order to select the template with the largest likelihood of being repeated (i.e., least likelihood of change). As a representative example, suppose that the template selection rules 1032 caused the template selection process 1038 to select template 1040 from expression 1036. Now suppose set 1028 represents a history of templates rather than a starting template set. Further suppose that an analysis of the history produced a probability distribution function indicating that template 1024 was the most likely template in the history. Furthermore, the selected template 1024 had never occurred in the template history. In that instance, it may be more beneficial to utilize template 1024 as part of a nested bundle rather than create a whole new template instance 1040 that is not likely to be repeated (at least based on the information gathered so far). In that case, the comparison process 1034 can identify rule changes for template selection rules 1032 that would yield the appropriate bundle.

In yet another example, the comparison process 1034 can evaluate different options and help select the best option for templates. This evaluation can take place completely offline and can be used to improve the template selection. For example, consider a process that looks at templates in the template history and looks at existing bundles and runs comparisons on the existing bundles and the overall memory usage that would occur if the bundles were compressed using differently selected templates. This process could be run by considering some subset of existing bundles, selected according to some criteria, such as random selection, selecting bundles compressed in some period of time (i.e., bundles that were created within the last week, month, or some other time window), nested bundles, and so forth. The selected bundles could be rehydrated, and the expression trees compared to identify the largest spanning trees that would compress the largest number of bundles. For example, if each expression tree were "overlaid" the differences could be noted and the bundles grouped by common nodes/subtrees. Rearranging the expression trees to find the largest common subset (i.e., greatest overlap for the greatest number of expression trees), would help identify likely candidates for templates. Multiple iterations could be performed, with each iteration identifying the next most common subset (i.e., next greatest overlap) and so forth until the set of candidate templates were identified. The expression trees could then be recompressed and the memory usage compared to the original bundles. If the memory usage were smaller, then the set of candidate templates can be used to recompress existing bundles. The template selection rules would then change to utilize the set of candidate templates.

As yet another example, multiple versions of candidate templates for the same expressions can be stored in order to analyze hit count (i.e., how many expressions come in that utilize the candidate template), match/hoist cost (cost in time, processor cycles, memory, etc. to match a particular template and hoist out the unique portions), rehydration cost (cost in time, processor cycles, memory, etc. to rehydrate an expression from a candidate template) and/or other metrics in order to select the most beneficial template forms over time. Thus, in some embodiments, multiple templates can exist for an expression and there doesn't necessarily have to be a unique correspondence between an expression and a template.

In this way, the "code book" of templates used to compress expressions can be updated as the expressions change over time. Even if the expressions do not change over time, there are still situations where the system can learn (i.e., through measuring the metrics as discussed above) which templates result in greater efficiencies. Furthermore, in some embodiments, if the difference between the "new" set of candidate templates and the old set of candidate templates does not yield an improvement greater than a threshold, no change need be made. In yet another alternative, even when an improvement exceeds a threshold, the recompression may not be triggered until some other system event, such as failover to a new server, a time limit from the last 'recompression', or some other type of event. Finally, these processes can all be performed offline in the background so as not to interfere with operation of the system.

As seen above, the comparison process 1034 represents a feedback loop that changes the template selection rules. This feedback loop may be applied in an incremental manner (i.e., considering expressions as they come in) or in a batch mode (i.e., considering a batch of expressions). The feedback loop may also be performed in the background, may be performed periodically or aperiodically, and/or may be performed based on the occurrence of some event or combination of events.

In the description of the embodiments of FIGS. 9 and 10, where comparisons are made, the comparisons can be made using pattern matching that matches trees and/or subtrees or can be made using signatures. The description below illustrates how signatures may be generated.

FIG. 11 illustrates a representative example 1100 of creating a signature for expressions. In this method 1100, the expression tree can be a template, an expression sub-template (i.e., a subtree of a template), an expression tree, and/or expression subtree. For ease of description these will all be referred to as "templates" in the description of FIG. 11 with the understanding that for this figure, the term applies more broadly.

Operation 1102 selects or receives the template that is to be compressed. Template 1104 is a representative example.

Operation 1106 next flattens the template and places the nodes in a given order. Any tree traversal algorithm can be used to identify all the nodes in the template and the order that the algorithm traverses the nodes of the tree can be the "flattened" order of the nodes in the template. Algorithms that visit nodes multiple times would only "output" a given node the first time it is visited. How the template is flattened is not important as long as the algorithm produces the same order for the same tree structure of a template. Flattened template 1108 represents the flattening of template 1104.

Operation 1110 converts the nodes of the flattened representation to a standard representation. Again it doesn't matter what algorithm is used as long as the representation uses the same representation for a given node. The standard representation will, however, account for things that should be matched and things that shouldn't be matched. For example, if constants are to be matched independent of the actual value of the constant, then the standard representation will convert constants of any value into the same standard representation. If the leaf nodes should not be considered when matching two trees, then converting to the standard representation can eliminate the leaf nodes or use "wildcard" representations for the leaf nodes. If the order of two nodes of a particular type do not matter, then the standard representation can convert all combinations of two nodes (i.e., ab, aa, bb, ba) into the same representation. From this description, those of skill in the art can understand that the conversion to a standard notation is a set of mapping rules that map things that should match to the same representation.

Operation 1114 optionally computes a fingerprint or some easy to compare representation from the standard representation. If, for example, it is easy to compare the standard representations of two items, then operation 1114 may not be needed. On the other hand, if comparing standard representations would be harder, say need a string comparison or something like that, then a hash or other function can be used to compute a fingerprint 1115 that can be easily compared. Whatever function is used for operation 1114 should have a low likelihood of two different standard representations being mapped to the same fingerprint 1115. A cryptographically strong hash function is suitable and many are known that have these properties. In this context, the function need not be hard to reverse to serve the purposes of operation 1114.

The fingerprint 1114 then becomes the signature 1118 as shown by operation 1116.

Example Machine Architecture and Machine-Readable Medium

Figure 12:
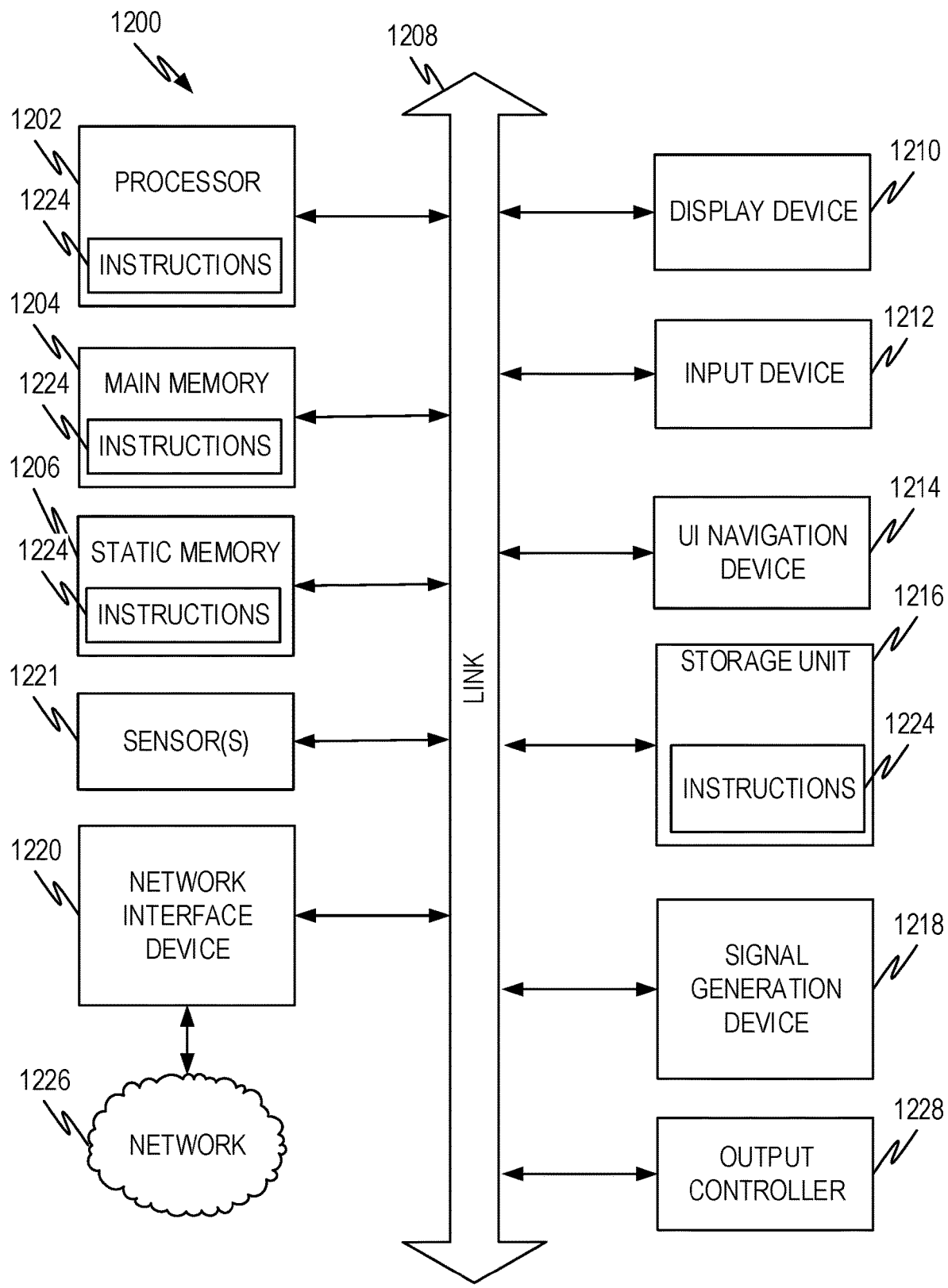
FIG. 12 illustrates a representative architecture of a machine suitable for implementing the systems and so forth or for executing the methods disclosed herein.

FIG. 12 illustrates a representative architecture of a machine suitable for implementing the systems and so forth or for executing the methods disclosed herein. The machine of FIG. 12 is shown as a standalone device, which is suitable for implementation of the concepts above. For the server aspects described above a plurality of such machines operating in a data center, part of a cloud architecture, and so forth can be used. In server aspects, not all of the illustrated functions and devices are utilized. For example, while a system, device, etc. that a user uses to interact with a server and/or the cloud architectures may have a screen, a touch screen input, etc., servers often do not have screens, touch screens, cameras and so forth and typically interact with users through connected systems that have appropriate input and output aspects. Therefore, the architecture below should be taken as encompassing multiple types of devices and machines and various aspects may or may not exist in any particular device or machine depending on its form factor and purpose (for example, servers rarely have cameras, while wearables rarely comprise magnetic disks). However, the example explanation of FIG. 12 is suitable to allow those of skill in the art to determine how to implement the embodiments previously described with an appropriate combination of hardware and software.

While only a single machine is illustrated, the term "machine" shall also be taken to include any collection of machines that individually or jointly execute a set (or multiple sets) of instructions to perform any one or more of the methodologies discussed herein.

The example of the machine 1200 includes at least one processor 1202 (e.g., a central processing unit (CPU), a graphics processing unit (GPU), advanced processing unit (APU), or combinations thereof), one or more memories such as a main memory 1204, a static memory 1206, or other types of memory, which communicate with each other via link 1208. Link 1208 may be a bus or other type of connection channel. The machine 1200 may include further optional aspects such as a graphics display unit 1210 comprising any type of display. The machine 1200 may also include other optional aspects such as an alphanumeric input device 1212 (e.g., a keyboard, touch screen, and so forth), a user interface (UI) navigation device 1214 (e.g., a mouse, trackball, touch device, and so forth), a storage unit 1216 (e.g., disk drive or other storage device(s)), a signal generation device 1218 (e.g., a speaker), sensor(s) 1221 (e.g., global positioning sensor, accelerometer(s), microphone(s), camera(s), and so forth), output controller 1228 (e.g., wired or wireless connection to connect and/or communicate with one or more other devices such as a universal serial bus (USB), near field communication (NFC), infrared (IR), serial/parallel bus, etc.), and a network interface device 1220 (e.g., wired and/or wireless).

Executable Instructions and Machine-Readable Medium

The various memories (i.e., 1204, 1206, and/or memory of the processor(s) 1202) and/or storage unit 1216 may store one or more sets of instructions and data structures (e.g., software) 1224 embodying or utilized by any one or more of the methodologies or functions described herein. These instructions, when executed by processor(s) 1202 cause various operations to implement the disclosed embodiments.

As used herein, the terms "machine-readable medium" and "computer-readable medium" mean the same thing and may be used interchangeably in this disclosure. The terms include a single medium or multiple media (e.g., a centralized or distributed database, and/or associated caches and servers) that store the one or more instructions or data structures. The terms shall also be taken to include any tangible medium that is capable of storing, encoding or carrying instructions for execution by the machine and that cause the machine to perform any one or more of the methodologies of the present invention, or that is capable of storing, encoding or carrying data structures utilized by or associated with such instructions. The terms shall accordingly be taken to include, but not be limited to, solid-state memories, and optical and magnetic media. Specific examples of machine-readable media/computer-readable media include non-volatile memory, including by way of example semiconductor memory devices, e.g., erasable programmable read-only memory (EPROM), electrically erasable programmable read-only memory (EEPROM), and flash memory devices; magnetic disks such as internal hard disks and removable disks; magneto-optical disks; and CD-ROM and DVD-ROM disks. The terms specifically exclude non-statutory signals per se, which are covered under the term "signal medium" discussed below.

Signal Medium

The term "signal medium" shall be taken to include any form of modulated data signal and signals per se. The term "modulated data signal" means a signal that has one or more of its characteristics set or changed in such a matter as to encode information in the signal.

EXAMPLE EMBODIMENTS

Example 1

A method for compressing expressions comprising:
receiving an expression in a standard representation format;
creating a template comprising a subset of the expression;
determining whether or not the template exists in a cache;
responsive to determining that the template exists in the cache, obtaining a cache reference to the template;
responsive to determining that the template does not exist in the cache, storing the template in the cache and obtaining the cache reference to the template;
subtracting the template from the expression to identify differences between the template and the expression; and
creating a bundle comprising the cache reference and the differences between the template and the expression.

Example 2

The method of example 1, further comprising:
selecting at least one difference between the template and the expression;
create a second template comprising a subset of the at least one difference;

subtracting the second template from the at least one difference to identify second differences between the second template and the at least one difference;
determining whether or not the second template exists in the cache;
responsive to determining the second template exists in the cache, obtaining a second cache reference to the second template;
responsive to determining the second template does not exist in the cache, storing the second template in the cache and obtaining the second cache reference to the second template; and
adding the second cache reference and the second differences to the bundle to create a nested bundle.

Example 3

The method of example 1, wherein the standard representation is an expression tree.

Example 4

The method of examples 1, 2 or 3, further comprising creating a fingerprint of the template.

Example 5

The method of example 1, 2 or 3, wherein creating the template comprises:
identifying portions of the expression that are not likely to change; and
placing at least some of those portions into the template.

Example 6

The method of example 5, wherein the portions of the expression that are not likely to change are identified by comparing the expression to a history of templates.

Example 7

The method of example 1, 2 or 3, wherein creating the template further comprises:
retrieving at least one template selection rule;
selecting the subset based on the at least one template selection rule.

Example 8

The method of example 1, 2 or 3, wherein creating the template further comprises:
comparing the expression to a plurality of candidate templates; and
selecting as the template a candidate template of the plurality of candidate templates that matches the largest portion of the expression.

Example 9

A machine-readable medium having executable instructions encoded thereon, which, when executed by at least one processor of a machine, cause the machine to perform operations comprising:
select an expression in a standard representation format;
create a template comprising a subset of the expression;
determine whether or not the template exists in a cache;
responsive to determining that the template exists in the cache, obtain a cache reference to the template;
responsive to determining that the template does not exist in the cache, store the template in the cache and obtain the cache reference to the template;
subtract the template from the expression to identify differences between the template and the expression; and
create a bundle comprising the cache reference and the differences between the template and the expression.

Example 10

The machine-readable medium of example 9, wherein the instructions cause the machine to perform further operations comprising:
select at least one difference between the template and the expression;
create a second template comprising a subset of the at least one difference;
subtract the second template from the at least one difference to identify second differences between the second template and the at least one difference;
determine whether or not the second template exists in the cache;
responsive to determining the second template exists in the cache, obtain a second cache reference to the second template;
responsive to determining the second template does not exist in the cache, store the second template in the cache and obtain the second cache reference to the second template; and
add the second cache reference and the second differences to the bundle to create a nested bundle.

Example 11

The machine-readable medium of example 9, wherein the standard representation is an expression tree.

Example 12

The machine-readable medium of example 9, wherein the instructions cause the machine to perform further operations comprising create a fingerprint of the template.

Example 13

The machine-readable medium of example 9, 10, 11 or 12, wherein the operation of create the template comprises the operations:
identify portions of the expression that are not likely to change; and
place at least some of those portions into the template.

Example 14

The machine-readable medium of example 13, wherein the portions of the expression that are not likely to change are identified by comparing the expression to a history of templates.

Example 15

The machine-readable medium of example 9, 10, 11 or 12, wherein the operation of create the template comprises the operations:

retrieve at least one template selection rule;
select the subset based on the at least one template selection rule.

Example 16

The machine-readable medium of example 9, 10, 11 or 12, wherein the operation of create the template comprises the operations:
comparing the expression to a plurality of candidate templates; and
selecting as the template a candidate template of the plurality of candidate templates that matches the largest portion of the expression.

Example 17

A computing system implementing secure removal of spilled data comprising:
a processor and executable instructions accessible on a machine-readable medium that, when executed, cause the system to perform operations comprising:
select an expression in a standard representation format;
create a template comprising a subset of the expression;
determine whether or not the template exists in a cache;
responsive to determining that the template exists in the cache, obtain a cache reference to the template;
responsive to determining that the template does not exist in the cache, store the template in the cache and obtain the cache reference to the template;
subtract the template from the expression to identify differences between the template and the expression; and
create a bundle comprising the cache reference and the differences between the template and the expression.

Example 18

The system of example 17, wherein the instructions cause the system to perform further operations comprising:
select at least one difference between the template and the expression;
create a second template comprising a subset of the at least one difference;
subtract the second template from the at least one difference to identify second differences between the second template and the at least one difference;
determine whether or not the second template exists in the cache;
responsive to determining the second template exists in the cache, obtain a second cache reference to the second template;
responsive to determining the second template does not exist in the cache, store the second template in the cache and obtain the second cache reference to the second template; and
add the second cache reference and the second differences to the bundle to create a nested bundle.

Example 19

The system of example 17, wherein the standard representation is an expression tree.

Example 20

The system of example 17, 18 or 19, wherein the instructions cause the machine to perform further operations comprising:
use the cache reference from the bundle to retrieve the template from the cache;
identify portions within the retrieved template where the differences can reside; and
place the differences within the identified portions to rehydrate the expression.

Example 21

A method for compressing expressions comprising:
receiving an expression in a standard representation format;
creating a template comprising a subset of the expression;
determining whether or not the template exists in a cache;
responsive to determining that the template exists in the cache, obtaining a cache reference to the template;
responsive to determining that the template does not exist in the cache, storing the template in the cache and obtaining the cache reference to the template;
subtracting the template from the expression to identify differences between the template and the expression; and
creating a bundle comprising the cache reference and the differences between the template and the expression.

Example 22

The method of example 21, further comprising:
selecting at least one difference between the template and the expression;
create a second template comprising a subset of the at least one difference;
subtracting the second template from the at least one difference to identify second differences between the second template and the at least one difference;
determining whether or not the second template exists in the cache;
responsive to determining the second template exists in the cache, obtaining a second cache reference to the second template;
responsive to determining the second template does not exist in the cache, storing the second template in the cache and obtaining the second cache reference to the second template; and
adding the second cache reference and the second differences to the bundle to create a nested bundle.

Example 23

The method of any preceding example, wherein the standard representation is an expression tree.

Example 24

The method of any preceding example, further comprising creating a fingerprint of the template.

Example 25

The method of any preceding example, wherein creating the template comprises:
identifying portions of the expression that are not likely to change; and
placing at least some of those portions into the template.

Example 26

The method of any preceding example, wherein the portions of the expression that are not likely to change are identified by comparing the expression to a history of templates.

Example 27

The method of any preceding example, wherein creating the template further comprises:
retrieving at least one template selection rule;
selecting the subset based on the at least one template selection rule.

Example 28

The method of any preceding example, wherein creating the template further comprises:
comparing the expression to a plurality of candidate templates; and
selecting as the template a candidate template of the plurality of candidate templates that matches the largest portion of the expression.

Example 29

The method as in any preceding example, wherein the subset selected as the template is selected based on information obtained from prior subset selections.

Example 30

The method of example 29, wherein selecting the subset based on information obtained from prior subset selections creates a feedback loop wherein the subset selected as the template is based on prior selected templates.

Example 31

The method as in any preceding example, further comprising:
use the cache reference from the bundle to retrieve the template from the cache;
identify portions within the retrieved template where the differences can reside; and
place the differences within the identified portions to rehydrate the expression.

Example 32

The method as in example 31 further comprising:
use the second cache reference from the bundle to retrieve the second template from the cache;
identify portions within the retrieved second template where the second differences can reside; and
place the second differences within the identified portions to rehydrate the expression.

Example 33

The method as in any preceding example, wherein creating a template comprising a subset of the expression comprises a pattern match.

Example 34

An apparatus comprising means to perform a method as set out in any preceding example.

Example 35

Machine-readable storage including machine-readable instructions, when executed, to implement a method or realize an apparatus as set out in any preceding example.

CONCLUSION

In view of the many possible embodiments to which the principles of the present invention and the forgoing examples may be applied, it should be recognized that the examples described herein are meant to be illustrative only and should not be taken as limiting the scope of the present invention. Therefore, the invention as described herein contemplates all such embodiments as may come within the scope of the following claims and any equivalents thereto.

What is claimed is:

1. A method for compressing expressions comprising:
receiving an expression in a standard representation format;
creating a template comprising a subset of the expression;
determining whether or not the template exists in a cache;
responsive to determining that the template exists in the cache, obtaining a cache reference to the template;
responsive to determining that the template does not exist in the cache, storing the template in the cache and obtaining the cache reference to the template;
subtracting the template from the expression to identify differences between the template and the expression; and
creating a bundle comprising the cache reference and the differences between the template and the expression.

2. The method of claim 1, further comprising:
selecting at least one difference between the template and the expression;
create a second template comprising a subset of the at least one difference;
subtracting the second template from the at least one difference to identify second differences between the second template and the at least one difference;
determining whether or not the second template exists in the cache;
responsive to determining the second template exists in the cache, obtaining a second cache reference to the second template;
responsive to determining the second template does not exist in the cache, storing the second template in the cache and obtaining the second cache reference to the second template; and
adding the second cache reference and the second differences to the bundle to create a nested bundle.

3. The method of claim 1, wherein the standard representation is an expression tree.

4. The method of claim 1 further comprising creating a fingerprint of the template.

5. The method of claim 1, wherein creating the template comprises:
identifying portions of the expression that are not likely to change; and
placing at least some of those portions into the template.

6. The method of claim 5, wherein the portions of the expression that are not likely to change are identified by comparing the expression to a history of templates.

7. The method of claim 1, wherein creating the template further comprises:
retrieving at least one template selection rule;
selecting the subset based on the at least one template selection rule.

8. The method of claim 1, wherein creating the template further comprises:
comparing the expression to a plurality of candidate templates; and
selecting as the template a candidate template of the plurality of candidate templates that matches the largest portion of the expression.

9. A machine-readable medium having executable instructions encoded thereon, which, when executed by at least one processor of a machine, cause the machine to perform operations comprising:
select an expression stored in a standard representation format;
create a template comprising a subset of the expression;
determine whether or not the template exists in a cache;
responsive to determining that the template exists in the cache, obtain a cache reference to the template;
responsive to determining that the template does not exist in the cache, store the template in the cache and obtain the cache reference to the template;
subtract the template from the expression to identify differences between the template and the expression;
create a bundle comprising the cache reference and the differences between the template and the expression; and
replace the expression with the bundle thus eliminating the expression in the standard representation format from storage.

10. The machine-readable medium of claim 9, wherein the instructions cause the machine to perform further operations comprising:
select at least one difference between the template and the expression;
create a second template comprising a subset of the at least one difference;
subtract the second template from the at least one difference to identify second differences between the second template and the at least one difference;
determine whether or not the second template exists in the cache;
responsive to determining the second template exists in the cache, obtain a second cache reference to the second template;
responsive to determining the second template does not exist in the cache, store the second template in the cache and obtain the second cache reference to the second template; and
add the second cache reference and the second differences to the bundle to create a nested bundle.

11. The machine-readable medium of claim 9, wherein the standard representation is an expression tree.

12. The machine-readable medium of claim 9, wherein the instructions cause the machine to perform further operations comprising create a fingerprint of the template.

13. The machine-readable medium of claim 9, wherein the operation of create the template comprises the operations:
identify portions of the expression that are not likely to change; and
place at least some of those portions into the template.

14. The machine-readable medium of claim 13, wherein the portions of the expression that are not likely to change are identified by comparing the expression to a history of templates.

15. The machine-readable medium of claim 9, wherein the operation of create the template comprises the operations:
retrieve at least one template selection rule;
select the subset based on the at least one template selection rule.

16. The machine-readable medium of claim 9, wherein the operation of create the template comprises the operations:
comparing the expression to a plurality of candidate templates; and
selecting as the template a candidate template of the plurality of candidate templates that matches the largest portion of the expression.

17. A computing system implementing secure removal of spilled data comprising:
a processor and executable instructions accessible on a machine-readable medium that, when executed, cause the system to perform operations comprising:
select an expression in a standard representation format;
create a template comprising a subset of the expression;
determine whether or not the template exists in a cache;
responsive to determining that the template exists in the cache, obtain a cache reference to the template;
responsive to determining that the template does not exist in the cache, store the template in the cache and obtain the cache reference to the template;
subtract the template from the expression to identify differences between the template and the expression; and
create a bundle comprising the cache reference and the differences between the template and the expression.

18. The system of claim 17, wherein the instructions cause the system to perform further operations comprising:
select at least one difference between the template and the expression;
create a second template comprising a subset of the at least one difference;
subtract the second template from the at least one difference to identify second differences between the second template and the at least one difference;
determine whether or not the second template exists in the cache;
responsive to determining the second template exists in the cache, obtain a second cache reference to the second template;
responsive to determining the second template does not exist in the cache, store the second template in the cache and obtain the second cache reference to the second template; and
add the second cache reference and the second differences to the bundle to create a nested bundle.

19. The system of claim 17, wherein the standard representation is an expression tree.

20. The system of claim 17, wherein the instructions cause the machine to perform further operations comprising:
use the cache reference from the bundle to retrieve the template from the cache;

identify portions within the retrieved template where the differences can reside; and place the differences within the identified portions to rehydrate the expression.

* * *